United States Patent
Lin et al.

(10) Patent No.: US 7,174,047 B2
(45) Date of Patent: Feb. 6, 2007

(54) SINGLE-INSTRUCTION MULTIPLE-DATA (SIMD)-BASED ALGORITHMS FOR PROCESSING VIDEO DATA

(75) Inventors: Wanrong Lin, Plainsboro, NJ (US); Anton Margoline, Brooklyn, NY (US); Dennis Bushmitch, Somerset, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 903 days.

(21) Appl. No.: 10/112,568

(22) Filed: Mar. 29, 2002

(65) Prior Publication Data

US 2003/0190085 A1    Oct. 9, 2003

(51) Int. Cl.
*G06K 9/46*    (2006.01)
(52) U.S. Cl. ............. 382/250; 382/245
(58) Field of Classification Search ........ 382/232–234, 382/244–247, 250–251; 375/240.03, 240.18–240.24, 375/240.25–240.26, 240.23; 712/7, 221; 708/203–209, 400–405
See application file for complete search history.

(56) References Cited

U.S. PATENT DOCUMENTS

| | | | | | |
|---|---|---|---|---|---|
| 5,461,422 | A | * | 10/1995 | Hsieh | 375/240.03 |
| 5,627,917 | A | * | 5/1997 | Chen | 382/246 |
| 5,991,865 | A | | 11/1999 | Longhenry et al. | 712/7 |
| 6,055,272 | A | * | 4/2000 | Kim | 375/240.23 |
| 6,338,135 | B1 | | 1/2002 | Dijkstra | 712/24 |

* cited by examiner

*Primary Examiner*—Ishrat Sherali
(74) *Attorney, Agent, or Firm*—RatnerPrestia

(57) ABSTRACT

In a video encoder/decoder, a method processes a discrete cosine transform (DCT) block of coefficients. The method receives a DCT block of coefficients, and linearizes the DCT block of coefficients into a one dimensional array of sequentially arranged coefficients. The method stores a portion of the one dimensional array of coefficients in a register, the portion including at least two sequentially arranged coefficients. The stored portion of coefficients in the register is processed. A next portion of coefficients in the one dimensional array is processed. This is repeated until the entire DCT block of coefficients have been loaded into the register. The processing may include computing a run length value, finding a class number, or determining dequantized coefficients of a DCT block.

12 Claims, 14 Drawing Sheets

BLOCK OF
8 X 8 PIXELS

| | | | | | | | |
|---|---|---|---|---|---|---|---|
| 139 | 144 | 149 | 153 | 155 | 155 | 155 | 155 |
| 144 | 151 | 153 | 156 | 159 | 156 | 156 | 156 |
| 150 | 155 | 160 | 163 | 158 | 156 | 156 | 156 |
| 159 | 161 | 162 | 160 | 160 | 159 | 159 | 159 |
| 159 | 160 | 161 | 162 | 162 | 155 | 155 | 155 |
| 161 | 161 | 161 | 161 | 160 | 157 | 157 | 157 |
| 162 | 162 | 161 | 163 | 162 | 157 | 157 | 157 |
| 162 | 162 | 161 | 161 | 163 | 158 | 158 | 158 |

FIG. 1

BLOCK OF 8 X 8
DCT COEFFICIENTS

| | | | | | | | |
|---|---|---|---|---|---|---|---|
| 315.91 | -0.26 | -3.02 | -1.30 | 0.53 | -0.42 | -0.68 | 0.33 |
| -5.65 | -4.37 | -1.56 | -0.79 | -0.71 | -0.02 | 0.11 | -0.30 |
| -2.74 | -2.32 | -0.39 | 0.38 | 0.05 | -0.24 | -0.14 | -0.02 |
| -1.77 | -0.48 | 0.06 | 0.36 | 0.22 | -0.02 | -0.01 | 0.08 |
| -0.16 | -0.21 | 0.37 | 0.39 | -0.03 | -0.17 | 0.15 | 0.32 |
| 0.44 | -0.05 | 0.41 | -0.09 | -0.19 | 0.37 | 0.26 | -0.25 |
| -0.32 | -0.09 | -0.08 | -0.37 | -0.12 | 0.43 | 0.27 | -0.19 |
| -0.65 | 0.39 | -0.94 | -0.46 | 0.47 | 0.30 | -0.14 | -0.11 |

FIG. 2

BLOCK OF 8 X 8
QUANTIZED
COEFFICIENTS

| | | | | | | | |
|---|---|---|---|---|---|---|---|
| 315.00 | 0.00 | -3.00 | -1.00 | 1.00 | 0.00 | -1.00 | 0.00 |
| -6.00 | -4.00 | -2.00 | -1.00 | -1.00 | 0.00 | 0.00 | 0.00 |
| -3.00 | -2.00 | 0.00 | 0.00 | 0.00 | 0.00 | 0.00 | 0.00 |
| -2.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 |
| -1.00 | 0.00 | -1.00 | 0.00 | 0.00 | 0.00 | 0.00 | 0.00 |

FIG. 3

ZIGZAG SCAN ORDERING OF COEFFICIENTS

ALTERNATE SCAN ORDERING OF COEFFICIENTS

SINGLE-INSTRUCTION MULTIPLE-DATA (SIMD)-BASED ALGORITHMS FOR PROCESSING VIDEO DATA

FIELD OF THE INVENTION

The present invention relates, in general, to a method of processing video data and, more specifically, to a method of simultaneously processing multiple discrete cosine transform (DCT) coefficients using SIMD-based algorithms.

BACKGROUND OF THE INVENTION

MPEG-2 (Motion Picture Experts Group-2) and DV (Digital Video) are two popular formats for digital video production used in the broadcasting industry. In both formats, a transform, such as a two-dimensional discrete cosine transform (DCT) is applied to blocks (e.g., four 8×8 blocks per macroblock) of image data (either the pixels themselves or interframe pixel differences corresponding to those pixels). The resulting transform coefficients are then quantized at a selected quantization level where many of the coefficients are typically quantized to a zero value. The quantized coefficients are then run-length encoded to generate part of the compressed video bitstream. In general, greater quantization levels result in more DCT coefficients being quantized to zero and fewer bits being required to represent the image data after performing run-length encoding.

The DCT transforms a block of image data (for example, a block of 8×8 pixels, as shown in FIG. 1) into a new block of transform coefficients (for example, a block of 8×8 DCT coefficients, as shown in FIG. 2). The transform is applied to each block until the entire image has been transformed. At the decoder, the inverse transformation is applied to recover the original image.

For typical images, a large proportion of the signal energy is compacted into a small number of transform coefficients. For example, the first coefficient in FIG. 2 is larger in magnitude than the remaining coefficients. The first coefficient is typically much larger than the other coefficients because it represents the DC energy while the other coefficients represent AC energy in different spatial frequency bands. The remaining coefficients represent energy levels at increasing horizontal frequencies, proceeding from left to right, and at increasing vertical frequencies proceeding from top to bottom. The coefficients at the bottom right corner represent energy levels at diagonal frequencies. Generally these coefficients tend to be small because images rarely contain significant amounts of diagonal information.

In a typical encoding scheme, the transform coefficients corresponding to those blocks of image data in the more-important regions are less severely quantized than those coefficients corresponding to the less-important regions. In this way, relatively more data (i.e., information) is preserved for the more-important regions than for the less-important regions. This is done by limiting the DCT coefficients to a fixed number of bits. The limiting of a coefficient is performed by shifting the coefficient from left to right, and spilling the least significant bits off the end of the register. In this way, the amplitude of the coefficient is also reduced. The number of bits remaining are pre-assigned individually for each of the 8×8 coefficients in the DCT block. The number of bits may be further reduced or increased, as necessary to maintain a constant bit rate.

The effect of quantization on the image may be seen in the block of quantized coefficients shown in FIG. 3. These quantized coefficients are the result of quantizing the DCT coefficients of FIG. 2 to the nearest integer. Many of the coefficients have been quantized to a value of zero. Some of the coefficients have been quantized to a value of +1 or −1.

When quantizing transform coefficients, differing human perceptual importance of the various coefficients may be exploited by varying the relative step-sizes of the quantizers for the different coefficients. The perceptually important coefficients may be quantized with a finer step size than the other. For example, low spatial frequency coefficients may be quantized finely, while the less important high frequency coefficients may be quantized more coarsely. A simple method to achieve different step-sizes is to normalize or weight each coefficient based on its visual importance. All of the normalized coefficients may then be quantized in the same manner, such as rounding to the nearest integer (uniform quantization). Normalization or weighting effectively scales the quantizer from one coefficient to another.

As shown in FIG. 3, many of the transform coefficients are frequently quantized to zero. There may be a few non-zero low-frequency coefficients and a sparse scattering of non-zero high-frequency coefficients, but the majority of coefficients may be quantized to zero. To exploit this phenomenon the two-dimensional array of transform coefficients is reformatted and prioritized into a one-dimensional sequence through a zigzag scanning process, as shown in FIG. 4. An alternate scanning process is shown in FIG. 5.

The zigzag or alternate scan ordering of coefficients results in most of the important non-zero coefficients (in terms of energy and visual perception) being grouped together early in the sequence. These are typically followed by long runs of coefficients that are quantized to zero. These zero-valued coefficients may be efficiently represented through run-length encoding. In run-length encoding, the number (run) of consecutive zero coefficients before a non-zero coefficient is encoded, followed by the non-zero coefficient value.

Processing 8×8 DCT coefficients is computationally intensive and is desirably performed quickly and efficiently. This invention addresses such a need.

SUMMARY OF THE INVENTION

To meet this and other needs, and in view of its purposes, the present invention provides a method of processing a discrete cosine transform (DCT) block of coefficients. The method receives a DCT block of coefficients, and linearizes the DCT block of coefficients into a one dimensional array of sequentially arranged coefficients. The method stores a portion of the one dimensional array of coefficients in a register, the portion including at least two sequentially arranged coefficients. The stored portion of coefficients in the register is processed. A next portion of coefficients in the one dimensional array is processed. This is repeated until the entire DCT block of coefficients has been loaded into the register. The processing may include computing a run length value, finding a class number, or determining dequantized coefficients of a DCT block.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures:

FIG. 1 is an example of an image data block of 8×8 pixels;

FIG. 2 is an example of a block of 8×8 DCT coefficients;

FIG. 3 is a quantized block of the 8×8 DCT coefficients of FIG. 2;

DETAILED DESCRIPTION OF THE INVENTION

Embodiments of this invention will now be described with reference to the figures. It should be appreciated that this invention is not limited to the exemplary embodiments selected for illustration in the figures. It should also be appreciated that variations and modifications to the exemplary embodiments may be made without departing from the spirit or scope of this invention.

Figure 4:
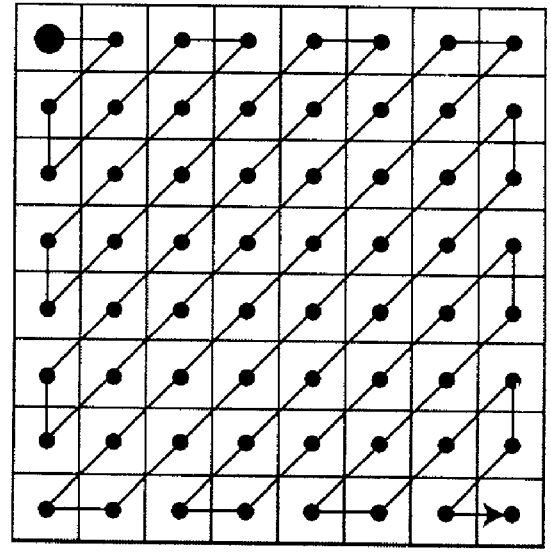
FIG. 4 is a zigzag scan ordering of coefficients.
Figure 5:
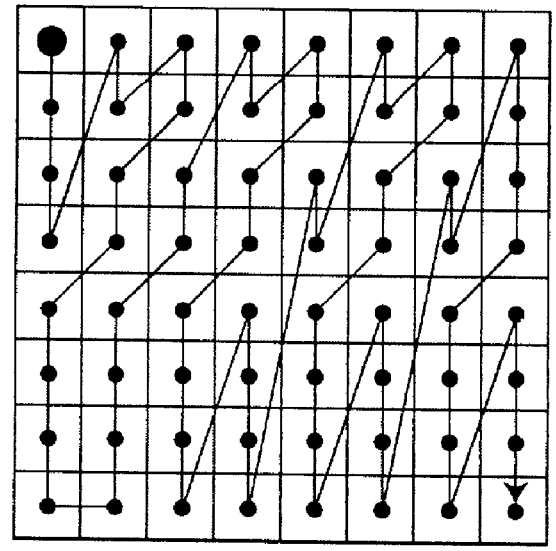
FIG. 5 is an alternate scan ordering of coefficients.
Figure 6:
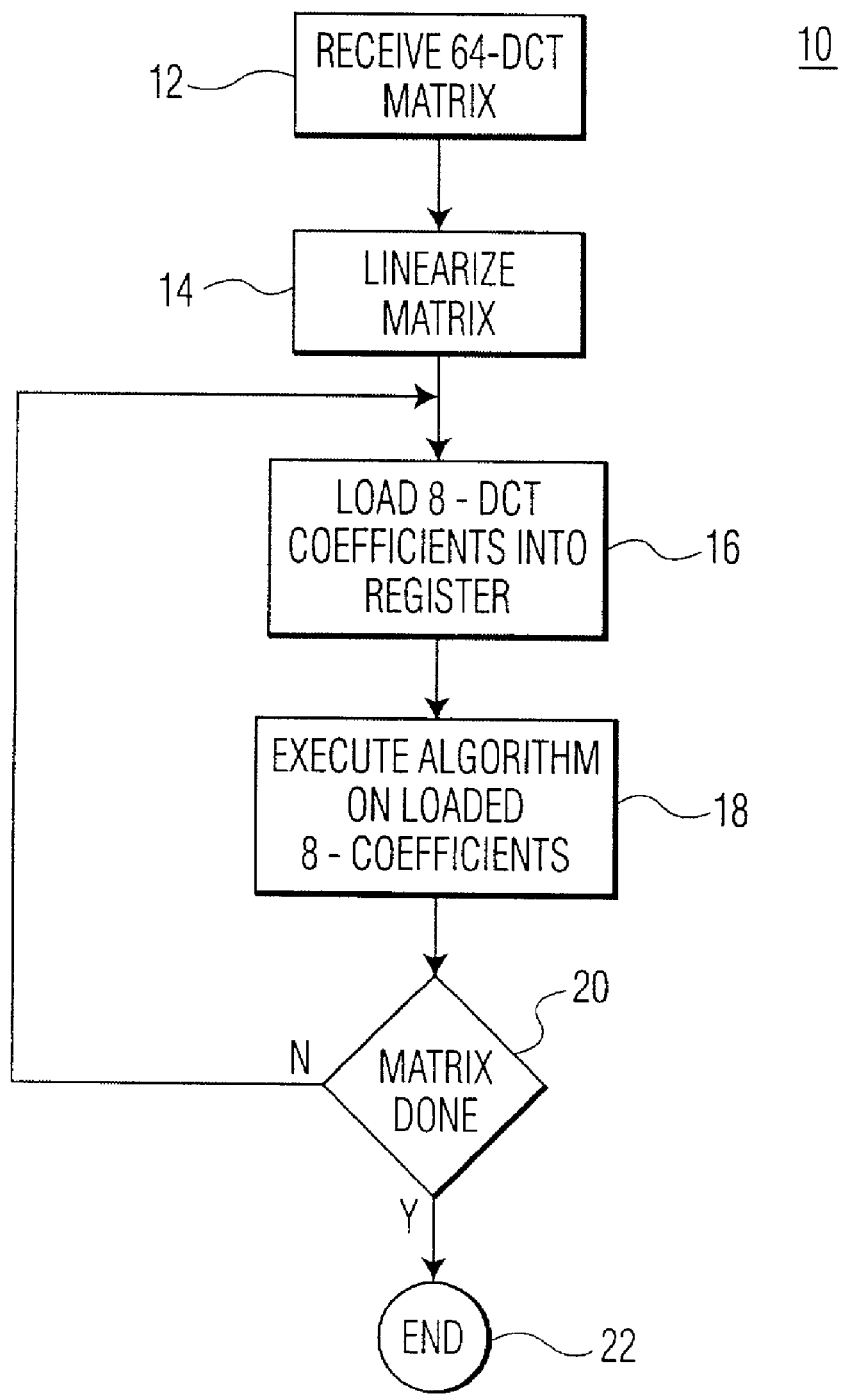
FIG. 6 is a flow diagram illustrating steps involved in a method of processing a DCT block of coefficients using SIMD-based algorithms in accordance with an embodiment of the invention.

Generally, this invention relates to a method of concurrently processing multiple DCT coefficients using SIMD-based algorithms. The method, generally designated as 10, is shown in FIG. 6. As shown, the method receives a 64-DCT (or 8×8 DCT) matrix in step 12. The matrix is linearized in step 14 using, for example, a zigzag scan order for the DCT coefficients (FIG. 4) or an alternate scan order for the DCT coefficients (FIG. 5). Each DCT coefficient is stored in memory as a two-byte integer (16-bits) in the linearized scan order (zigzag or other).

The linearized DCT coefficients are loaded, several at a time, into a single register. For example, step 16 loads 8-DCT coefficients into a 128-bit register. The 8-DCT coefficients are loaded in parallel, generating a 128-bit word in the register. The method executes an algorithm on the 128-bit word (step 18). As explained below, the algorithm may include run length computation, DCT data classification, de-quantization computation, or another algorithm using a register that is parallel-loaded with several DCT coefficients.

The method branches to decision box 20 and determines whether the algorithm has completed processing the entire DCT matrix. If processing of the entire DCT matrix is not completed, the method branches to step 16 and loads the next set of DCT coefficients into the 128-bit register. The algorithm is then executed on the next set of DCT coefficients. This process is continued, until decision box 20 determines that the entire DCT matrix has been processed. The method ends in step 22.

A. Run Length Computation

Figure 7:
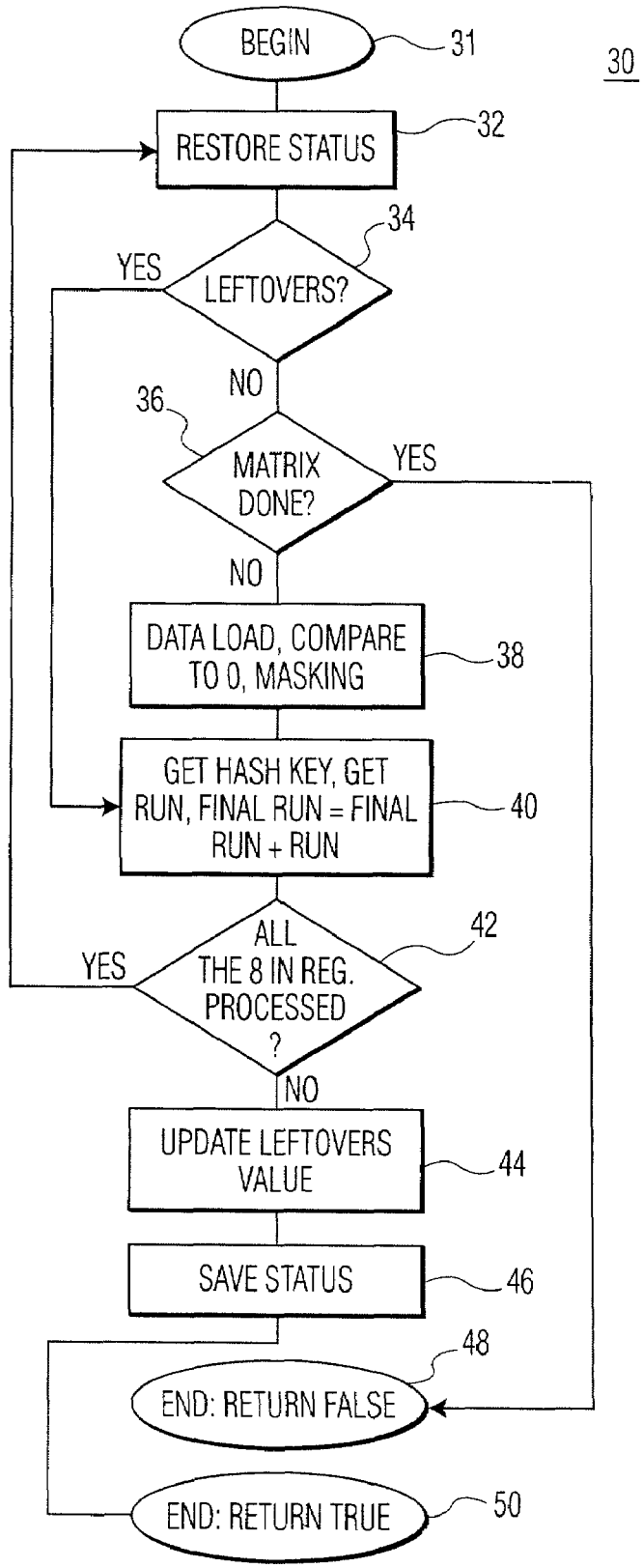
FIG. 7 is a flow diagram illustrating steps involved in a method of processing a DCT block of coefficients to obtain a run length of zero values between two non-zero values in the DCT matrix in accordance with an embodiment of the invention.

Referring to FIG. 7, there is shown a method for performing run length computation, generally designated as 30. The method finds the run length (Runlen.run) and the amplitude (Runlen.amp) of the DCT matrix. The method, which uses an algorithm (GetNextRunLen) including instructions listed in Table 1, is discussed below.

TABLE 1

Get NextRunLen Algorithm

| Code | Description |
|---|---|
| `inline bool DV50DCTEnc::GetNextRunLen (RunAmp& runlen)`<br>`{`<br>`//Variables used in the algorithm`<br>`bool Condition = true;`<br>`char Run;`<br><br>`__asm`<br>`{`<br>`//-----------------------------Prepare the registers by zeroing them-------------------------------//`<br>`xor  EAX,EAX          ; //Just making sure EAX is 0, prepare for masking`<br>`xor  EDX,EDX          ; //Just making sure EDX is 0, prepare for masking`<br>`xor  ECX,ECX          ; //Just making sure ECX is 0, prepare for masking`<br>`xor  ESP,ESP          ; //Just making sure ESP is 0, prepare for masking`<br>`pxor xmm7,xmm7        ;`<br><br>`//-----------------------------Load in the data from global variables-------------------------------//`<br>`mov  EBX, this;`<br>`mov  DL, [EBX]DV50DCTEnc.NextToEnc    ;`<br>`mov  DH, DL                           ;`<br>`mov  CL, [EBX]DV50DCTEnc.Valid_Bits   ;`<br>`mov  EDI, [EBX]DV50DCTEnc.PointTo     ;`<br>`mov  SP, [EBX]DV50DCTEnc.AL_Value     ;`<br><br>`//-----------------------------Testing for the leftover value------------------------------//`<br>`and  CL,CL            ;`<br>`Jnz  get_run          ;//Jump to getrun if Valid bits are present (from leftout value)`<br><br>`//-----------------------Data Load from the matrix could happen more then once----------------//`<br>`new_load:`<br>`cmp  DL,62            ;//If NextToEInc <63 Then return function false`<br>`Ja   function_end_false  ;`<br>`movdqa  xmm1, [edi]   ; //Load Matrix in xmm1`<br><br>`PCMPEQW xmm1,xmm7     ; //compare for 0, if 0 in Matrix then 1 in the xmm1;`<br>`Pmovmskb eax, xmm1    ; //move bit mask (for byte values) to the EaX`<br><br>`Mov  CL, 8            ; //Move 8 to the Valid_Bits because there is no remainder`<br>`add  EDI, 16          ; //Move along the location of the matrix`<br>`mov  SP , AX          ; //Make a copy of AX (leftovers)`<br><br>`//-----------------------Determine the Run, store the remainder, return values---------------//`<br>`get_run:`<br>`mov  AX, SP           ; //Put AX for mapping, works for the reloading situations (with leftovers)`<br>`shr  AH,1             ;// Shift the top 8 bits by 1`<br>`xor  AL,AH            ;// AL now is the value for the "magic" Table`<br>`mov  EBX, pMacTable;  //Pointer to a table`<br>`xlatb                 ; //Maps AL+EBX onto AL` | The Boolean function carrying the GetNextRunLen algorithm<br><br>Local Variables Condition is a return value for the GetNextRunLen function initially set to true; Run is a final number of zero values between the last and next non-zero matrix value.<br><br>XOR instruction sets the registers to zero thus preparing the algorithm variables.<br><br>The data is loaded from the class. The only way assembler gets the class members is when EBX is equal to this local pointer.<br>DL, DH, CL are 8 bit resisters carrying the char variables.<br>SP is 16 bit which is unsigned short int and EDI is 32 because it allocated a pointer value.<br><br>CL represents the Valid_Bits value that comes from the previous run (if no previous run existed Valid_Bits is initialized to 0). Valid_Bits may only be non-zero when the previous run did not finish processing the 8-element load from the XMM register. Thus the comparison AND followed by conditional JNZ jump determines if the algorithm should jump though the loading part (to get_run) in case the previous run did not finish the loaded 8 elements.<br><br>NextToEnc is compared with 62 to determine if the matrix has come to an end (DC coefficient is not present in the matrix)<br>new_load part loads an 8-element part of the 64 data matrix pointed by PointTo into the xmm1 register. Comparison for equal instruction of XMM1 (PCMPEQW) with XMM7 set to zeros will write 1nes for every 0 and 0 for all the non-zero values in xmm1 register with the 8 element data.<br><br>After that the byte masking instruction (PMOVMSKB) takes the first single bit out of the xmm1 and creates a 16bit value in the AX register with 0s and 1s. Every 0 and non-zero will be represented by two 1nes and 0s because array of elements is 2 bytes each.<br><br>The PointTo Matrix is moved by 8 elements further so next time newer 8 can be loaded (add EDI, 16) and a copy of AX is stored in SP.<br><br>SP is copied into AX. This is done for the further instruction XLATB, which requires its operands to be in AL register.<br>AX is separated on AH and AL (by register structure), thus if we shift AH by 1 to the right and XOR it with AL we will get a unique number corresponding to the AX value.<br>XLATB instruction requires EBX pointer to be pointed to a table. XLATB maps the unique number in AL register to the pMacTable to get the temporary Run value.<br>NextToEnc is incremented by the Run value. Run is subtracted from Valid_Bits to get the number of elements left in the leftovers mask, for example if the new_load just happened and Valid_Bits is 8, Run was determined to be 5, Valid_Bits now is 3 because 3 elements are in the leftovers to be scanned in the next function call.<br><br>If Valid_Bits is 0 then we need to load next 8 elements in order to find a next non-zero value in the data matrix. Thus jump to part 2 (new_load).<br>Valid_Bits is decremented by 1 because the non-zero element in the leftovers mask should not be counted |

TABLE 1-continued

Get NextRunLen Algorithm

| | | | |
|---|---|---|---|
| add  DL, AL | ; // Add the Run number to the current position (NextToEnc_current + Run) | | when the next function call proceeds. Since the NextToEnc value was copied into the DL and DH and only the DL value has been updated, DH carries the NextToEnc that was passed on by the last run. Thus to get a Final Run value we have to subtract old NextToEnc (DH) from the updated one (copy of DL in BL). |
| sub  CL, AL | ; // Get updated Valid Bits Number (Valid Bits-Run) | | |
| | | | Since EBX was used in the XLATB instruction in order to access the class variables it has to be stored with this pointer again. Valid_Bits value is stored for future use. NextToEnc is incremented by 1 in order to start the next function call with the next zero value so that we don't count the non-zero we just found. After which the NextToEnc is stored. |
| and  CL,CL | ; // See if its time to reload (no more data, Valid Bits = = 0) | | |
| jz  new_load | ; | | The leftovers mask stored in the SP have to be shifted by the (Run+1)*2 in order for it to have the updated value after the current scan. |
| sub  CL,1 | ; //Decrement Valid Bits | | SP is stored in AL_Value (which is leftovers). |
| mov  BL, DL | ; //Make a copy of the NextToEnc_current | | Jump to the finish. |
| sub  BL, DH | ; //Substract NextToEnc_current with the NextToEnc_old to get Run_final | | |
| mov  Run, BL | ; //Store Run_final | | |
| | | | The Condition variable is the return of the function carrying GetNextRunLen algorithm. This case happens when the NextToEnc >62 which means that the whole data matrix pointed by PointTo was scanned. |
| mov  EBX, this | ; | | |
| mov  [EBX]DV50DCTEnc.Valid_Bits, CL | ; | | |
| add  DL,1 | ; //Increment NextToEnc_current | | Pointer to the data matrix is updated so that next function call is loading the right data. |
| mov  [EBX]DV50DCTEnc.NextToEnc, DL | ; | | |
| | | | Runlen.Run is Run and Runlen.amp is the value that is before the NextToEnc. |
| mov  CL, AL | ; //Make a copy of Run_Final | | Return. |
| Add  CL,1 | ; // | | |
| shl  CL, 1 | ; //multiply by 2 | | |
| shr  SP,CL | ; //Shift The AL_Value (leftovers), by the (Run+1)*2 | | |
| mov [ebx]DV50DCTEnc.AL_Value, SP; | | | |
| jmp done | ; //Finish with return true | | |
| //------------------Condition when NextToEnc >62 which means all the matrix was scanned --------------------// | | | |
| function_end_false: | | | |
| mov  Condition,0; | | | |
| //------------------------------------------------------------------------------------------------------------- | | | |
| // | | | |
| done: | | | |
| mov  [ebx]DV50DCTEnc.PointTo, EDI; | | | |
| } //asm | | | |
| //Set the RunAmp values to the ones from the algorithm | | | |
| runlen.run= Run; | | | |
| runlen.amp = LinearMemBase [NextToEnc-1]; | | | |
| return Condition; | | | |

The algorithm is implemented in a Boolean function, which returns a true value (step 50 in FIG. 7) if the run length and amplitude are found, and returns a false value (step 48) if the run length and amplitude are not found, because the end of the matrix has been reached. It will be appreciated that the run length is the number of zero values between two non-zero values in a DCT matrix. Amplitude is the value of the next non-zero value in the DCT matrix.

The embodiment of FIG. 7 and the processor instructions of Table 1 are implemented, for example, in SSE2 (Streaming SIMD Extension 2) instructions introduced in the Pentium NetBurst technology (Intel Pentium 4). A specific set of instructions operate with 8 processor allocated 128 bit registers (XMM0–XMM7) to process data (packed char, short int, int, float and other data) in parallel with the SSE2 instructions.

The method begins in step 31 and restores status of the registers in step 32. The registers are each initialized to zero value. Decision box 34 determines if leftover bits (explained below) exist in a 128-bit XMM register. If no leftover bits exist (an indication that all 8-DCT coefficients in the XMM register have been processed), the method enters decision box 36. A determination is made on whether the entire 64-DCT matrix has been processed. If the matrix has been entirely processed, the method branches to step 48 and returns false (a Boolean function indicating that the block does not contain any more runs of zeroes followed by a non-zero value). If the matrix, on the other hand, has not been entirely processed, the method enters step 38 and performs a "data load" operation, a "compare to 0" operation and a "masking" operation. Each of these is individually discussed below.

Figure 8:
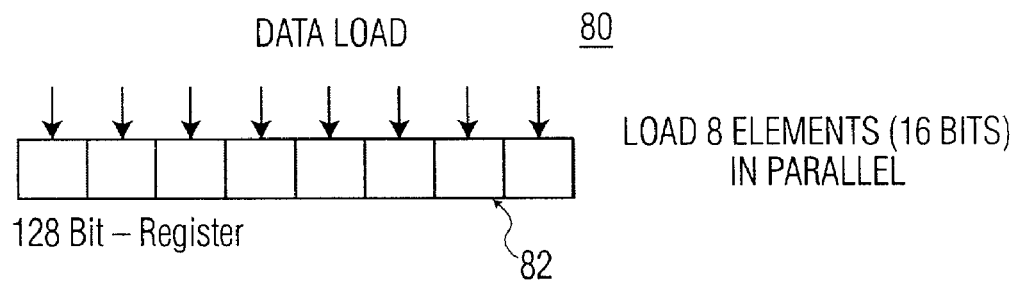
FIG. 8 is a schematic illustration of 8 DCT coefficients (16-bits each) loaded in parallel into a 128-bit register in accordance with an embodiment of the invention.

The "data load" operation, generally designated as 80, is schematically illustrated in FIG. 8. As shown, 8 elements (or 8-DCT coefficients ) are loaded in parallel into register 82. Each element is a 16-bit word (2 bytes), extracted from memory (not shown) and loaded into register 82. After loading 8 elements in parallel, register 82 is packed with 128-bits. In the exemplary embodiment, register 82 may be an XMM register and the SSE2 instruction set may be used.

Figure 9:
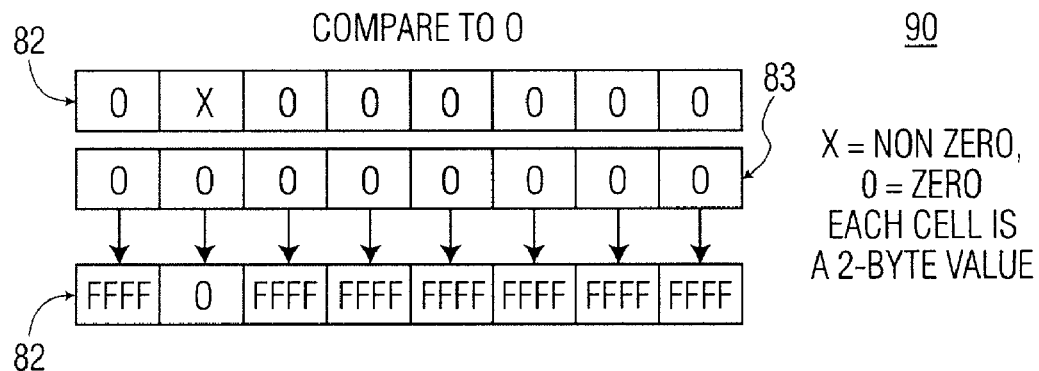
FIG. 9 is a schematic illustration of a comparison between DCT coefficients loaded into a register and zero values loaded into another register (compare to 0) in accordance with an embodiment of the invention.

The "compare to 0" operation, generally designated as 90, is schematically illustrated in FIG. 9. As shown, the "compare to 0" operation compares the word value stored in register 82 with a zero value word stored in register 83 (128-bit register packed with zeroes). For discussion purposes, the data loaded into register 82 are 8-DCT coefficients, in which all 7 of the coefficients have zero values and one of the coefficients has a non-zero value.

The "compare to 0" operation may use an SSE2 instruction, PCMEQW, which compares two XMM registers for equal words (16-bits, 2 bytes) and replaces the first operand with "ones" if the numbers are equal in corresponding words of the first and second register, and to "zeros" if not equal. As shown in FIG. 9, the values in register 82 are replaced with "ones" (FFFF in hex) for corresponding equal values and with "zeros" for corresponding non-equal values.

Figure 10:
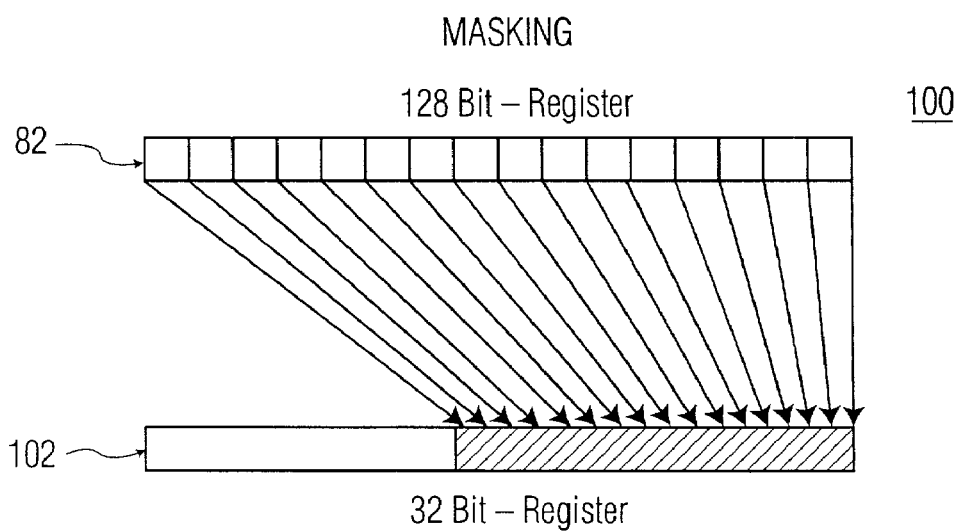
FIG. 10 is a schematic illustration of a masking step involving an extraction of bits from one register and storage of the extracted bits in another register in accordance with an embodiment of the invention.

After performing the "compare to 0" operation, the method performs a "masking" operation, generally designated as 100 in FIG. 10. The masking operation extracts the first bit of each byte from register 82, and stores it into the last 16-bits of register 102. For example, register 102 may be a 32 bit EAX register. As a result of the masking operation, every word (16-bits) in register 82 is represented by two masked bits in register 102.

Figure 11:
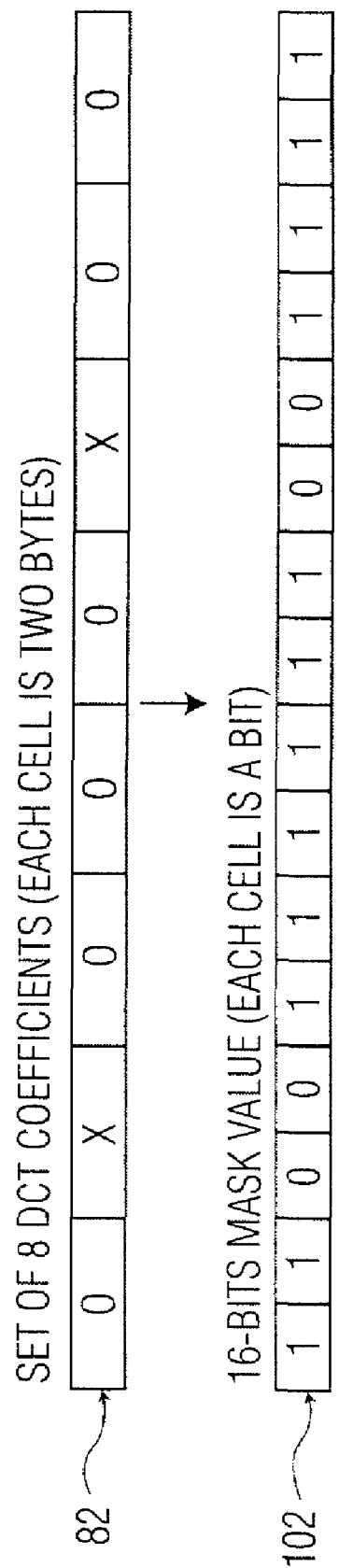
FIG. 11 is another schematic illustration of masking in which 8 DCT coefficients from one register are converted to a 16-bits mask value in another register in accordance with an embodiment of the invention.

Another illustration of a masking operation is shown in FIG. 11. As shown, register 82 includes another set of 8-DCT coefficients, in which "X" represents non-zero values. After performing the "compare to 0" operation, the masking operation extracts two bits for every 2 bytes of the comparison results from register 82 and places them into register 102. As illustrated, two "ones" represent each DCT coefficient having a zero value, and two "zeros" represent each DCT coefficient having a non-zero value. The masking operation may use an SSE2 instruction, PMOVMSKB, which is a byte mask instruction to store a first bit of every byte from an XMM register into a second half of a general purpose EAX register.

Returning to FIG. 7, after completing step 38 (data load, compare to 0, and masking), the method enters step 40 and performs "get hash key" and "get run" operations. Each of these is discussed below.

Figure 12:
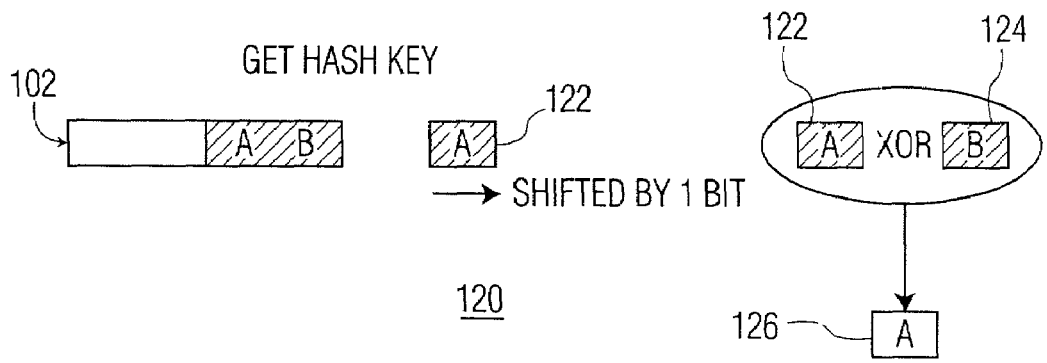
FIG. 12 is a schematic illustration of obtaining a hash key value by manipulating bits in a register in accordance with an embodiment of the invention.

The "get hash key" operation, generally designated as 120, is schematically illustrated in FIG. 12. As shown, register 102 (32-bit register) contains a 16-bit mask value of which 8 high bits are represented as A and 8 low bits are represented as B. A unique 8-bit hash key value is generated from the 16-bit mask value by shifting the 8 high bits by 1-bit to the right, and then performing an exclusive bit OR instruction (XOR) that compares the shifted 8 high bits (122) with the 8 low bits (124). The unique 8-bit hash key value generated from the XOR instruction is shown designated as 126.

Figure 13:
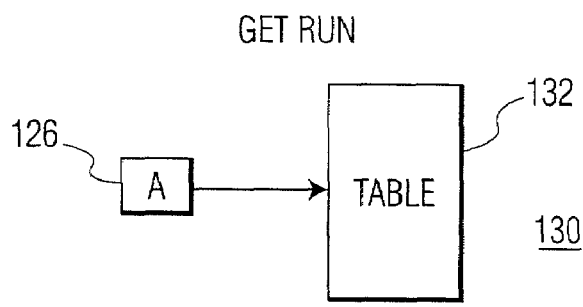
FIG. 13 is a schematic illustration of obtaining a run length by locating the hash key value of FIG. 12 in a look up table in accordance with an embodiment of the invention.

The unique 8-bit hash key value is then used in a "get run" operation, generally designated as 130 in FIG. 13. The "get run" operation finds the hash key value in look-up table 132 and obtains a temporary run length value. Table 132 includes 256 entries.

It will be appreciated that in the exemplary method of FIG. 7, a 16-bit value may be derived by byte-masking of a word-packed SSE2 comparison result (there is no word-masking instruction in SSE2). Any zero DCT coefficient may be mapped to 2-bit "1"s and any non-zero coefficient may be mapped to 2-bit "0"s. As a result, a set of 8-DCT coefficients (2-byte each) may be mapped to a set of 16-bits. This mapping is shown, for example, in FIG. 11.

In general, if a set of 8-DCT coefficients is denoted by C and the 16-bit mask value is denoted by M or M(C), the run value for C (which is the number of consecutive zeros in C, counting from right to left) may be found in a lookup table. Since there are 256 possible combinations of zero and non-zero DCT coefficients in C, the method finds the run value for each combination using a 256-entry table. A table index (0–255) is included for each combination. Since M is 16-bits long and, therefore, may not be directly used as the table index, a hash value (hash key) is derived from M.

The hash key, in general, may be computed as follows:
(1) M is divided into two parts, the higher 8-bits (MH) and the lower 8-bits (ML).
(2) The hash key $H(M)=(MH>>1)$ xor ML, where ">>1" stands for logic shifting to the right by 1-bit and "xor" stands for bitwise exclusive or operation.

For H to be a table index, it is desirably unique to each M, that is to say, every different M should generate a different H. This may be proved as follows:
(1) Suppose a 4-bit variable A has 4-bits denoted as (a3, a2, a1, a0) and a3=a2, a1=a0. If A is divided into two parts AH=(a3, a2) and AL=(a1, a0), and $H(A)=(AH>>1)$ xor AL, then H is unique to each A:
H(0000)=00 xor 00=00
H(0011)=00 xor 11=11
H(1100)=01 xor 00=01
H(1111)=01 xor 11=10
(2) Next suppose A is a 8-bit variable (a7, a6 . . . , a0), with a7=a6, a5=a4, . . . , a1=a0. As before, A may be broken into two parts, AH=(a7, a6, a5, a4) and AL=(a3, a2, a1, a0) and $H(A)=(AH>>1)$ xor AL. To verify that H is now also unique to A, two instances of variable A may be denoted as J and K, such that H(J)=H(K), namely:
H(j)=(0, j7, j6, j5) xor
(j3, j2, j1, j0)=(u3, u2, u1, u0)
H(K)=(0, k7, k6, k5) xor
(k3, k2, k1, k0)=(v3, v2, v1, v0)
And (u3, u2, u1, u0)=(v3, v2, v1, v0)
Based on (1), in order to make (u3, u2)=(v3, v2), one must have (j7, j6, j3, j2)=(k7, k6, k3, k2). Since j6=k6, in order to make k1=v1, one must have j1=k1, namely j0=k0 (recall that j1=j0, k1=k0). Since j0=k0, in order to make u0=v0, one must have j5=k5, namely j4=k4. In summary, in order to make H(J)=H(K), one must have (j7, j6, j3, j2, j1, j0, j5, j4)=(k7, k6, k3, k2, k1, k0, k5, k4), namely J=K. Therefore, H is unique to each A.
(3) The approach used in (1) and (2) above may be extended to cases where A is a 16, 32, 64 . . . bit variable.
With H satisfying the uniqueness, the method may use a run-length table R[256], where R[i]=(run of C such that H(M(C))=i). In the look up process, the run is R[H(M(C))].

Returning to FIG. 7, the "get run" operation (step 40) obtains a temporary run length value for the look-up process. The run length value is temporary, because it is possible that all elements processed are zeroes and the next load may also contain zeroes. The run length value may also show the number of zeroes between a non-zero member and an end of the register. Consequently, step 40 computes a final run length value, which is a sum of the temporary run length values (i.e. the sum of the leftover run from the previous group of eight coefficients and the current temporary run). Assuming that at least one of the coefficients was non-zero, the final run length value is the actual number of zeroes between two non-zero coefficients in the DCT matrix.

Decision box 42 determines whether all 8 coefficients loaded into the XMM register have been processed. If all 8 coefficients have not been processed, the method branches to step 44 and updates a leftovers mask value (explained below). The method stores the leftover value of the 16-bit mask in step 46 (save status). If all 8 coefficients have been processed, the method continues to load a new set of 8 DCT coefficients into the register. If leftover bits exist, decision box 34 branches to step 40 and computes the next temporary run length value (get run).

In the example shown in FIG. 11, after the first run length value is determined to be 2 (bits counted from right to left), the 16-bit mask value in register 102 is shifted by six bits to the right (shifted until the value after non-zero). The next run length value may then be computed to be 3 by again using the hash key and the run-length table.

In the exemplary embodiment of FIG. 7, the method uses SSE2 instructions for an Intel Pentium 4. The register structure for the Pentium 4 is listed in Table 2. Definitions of various program parameters for the GetNextRunLen algorithm are provided in Table 3.

TABLE 2

General Register Structure (high and low)

XMM0–XMM7 128-bit registers for use with SSE2 instructions to calculate packed data.
EAX (32 Bits, 4 Bytes) => AX (16 Bits, 2 Bytes) => AH + AL (8 Bits, 1 Byte)
EBX (32 Bits, 4 Bytes) => BX (16 Bits, 2 Bytes) => BH + BL (8 Bits, 1 Byte)
ECX (32 Bits, 4 Bytes) => CX (16 Bits, 2 Bytes) => CH + CL (8 Bits, 1 Byte)
EDX (32 Bits, 4 Bytes) => DX (16 Bits, 2 Bytes) => DH + DL (8 Bits, 1 Byte)
ESI (32 Bits, 4 Bytes) => SI (16 Bits, 2 Bytes)
EDI (32 Bits, 4 Bytes) => DI (16 Bits, 2 Bytes)
EBP (32 Bits, 4 Bytes) => BP (16 Bits, 2 Bytes)
ESP (32 Bits, 4 Bytes) => SP (16 Bits, 2 Bytes)

TABLE 3

Program References for GetNextRunLen Algorithm

AL_Value (leftovers) = a public variable that stores the remaining mask bits of the 8 elements left by the previous runs.
Temporary Run = the number of zeroes between two non-zero elements that is determined by the hash table, it is temporary because if the load of 8 elements has a non-zero member and all zeroes after, then the number in the hash table will show the remaining zero members of the 8 elements loaded into XMM register, thus the Temporary Run can also show the number of Zeroes between a non Zero and end of the XMM register.
Final Run = the sum of Temporary Runs showing the real number of zeroes between two non Zero elements in the Matrix.
Amplitude = the value of the next non-zero element of the data matrix encountered in the scanning of the GetNextRunLen function.
Condition = Boolean return type for the Boolean GetNextRunLen function. Initially it is defined to be true for performance issues. When the matrix reaches the 62nd element, Condition is set to 0 and function returns false.
NextToEnc = a pointer in the matrix showing the position of the first unprocessed element.
pMacTable = a pointer to the Run Table.
PointTo = a pointer indicating the position of the next SSE2 loading in the algorithm.
Run Table = a generated 256 entry table that returns Run value when inquired with a transformed mask. (Hash Key)
Hash Key = a transformed mask (Mask of the 8 elements loaded from the matrix) used as an index to the Run Table to get temporary Run value.
Leftovers = the remaining mask bits of the 8 elements load after a previous run. In every function run Leftovers value is decreased to correspond to the number of unprocessed elements in the 8-element load.
Data matrix-0 to 62 value (63 total) matrix that does not contain DC coefficient.
get_run = a part in the algorithm that represents the getting Run and storing the values (last step of the algorithm)
new_load = a part in the algorithm that represents the loading of the 8 new elements from the data matrix and masking them into the EAX register.
Valid_Bits = the number of unprocessed elements in the 8 elements XMM register after load. When load happens Valid_Bits is set to 8. Every time Valid_Bits comes to 0 new_load is activated to load in new 8 elements.

Figure 14:
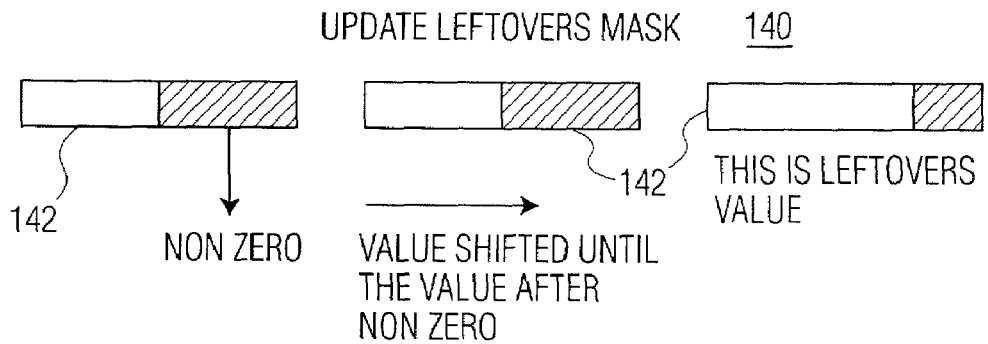
FIG. 14 is a schematic illustration of updating a leftovers mask value by manipulating bits in a register in accordance with an embodiment of the invention.

The "update leftovers mask" operation, generally designated as 140, is schematically depicted in FIG. 14. Having found a first temporary run length value, up to a non-zero bit in masking register 142, the method shifts the bits in register 142 to the right, until the value after the non-zero bit. The leftover value in register 142 corresponds to the DCT coefficients that have not yet been processed. In other words, the leftovers value is the remaining mask bits of the 8 elements loaded after a previous run. In every run, the leftovers value is decreased to correspond to the number of unprocessed elements in the 8-element load.

B. DCT Data Classification

Figure 15:
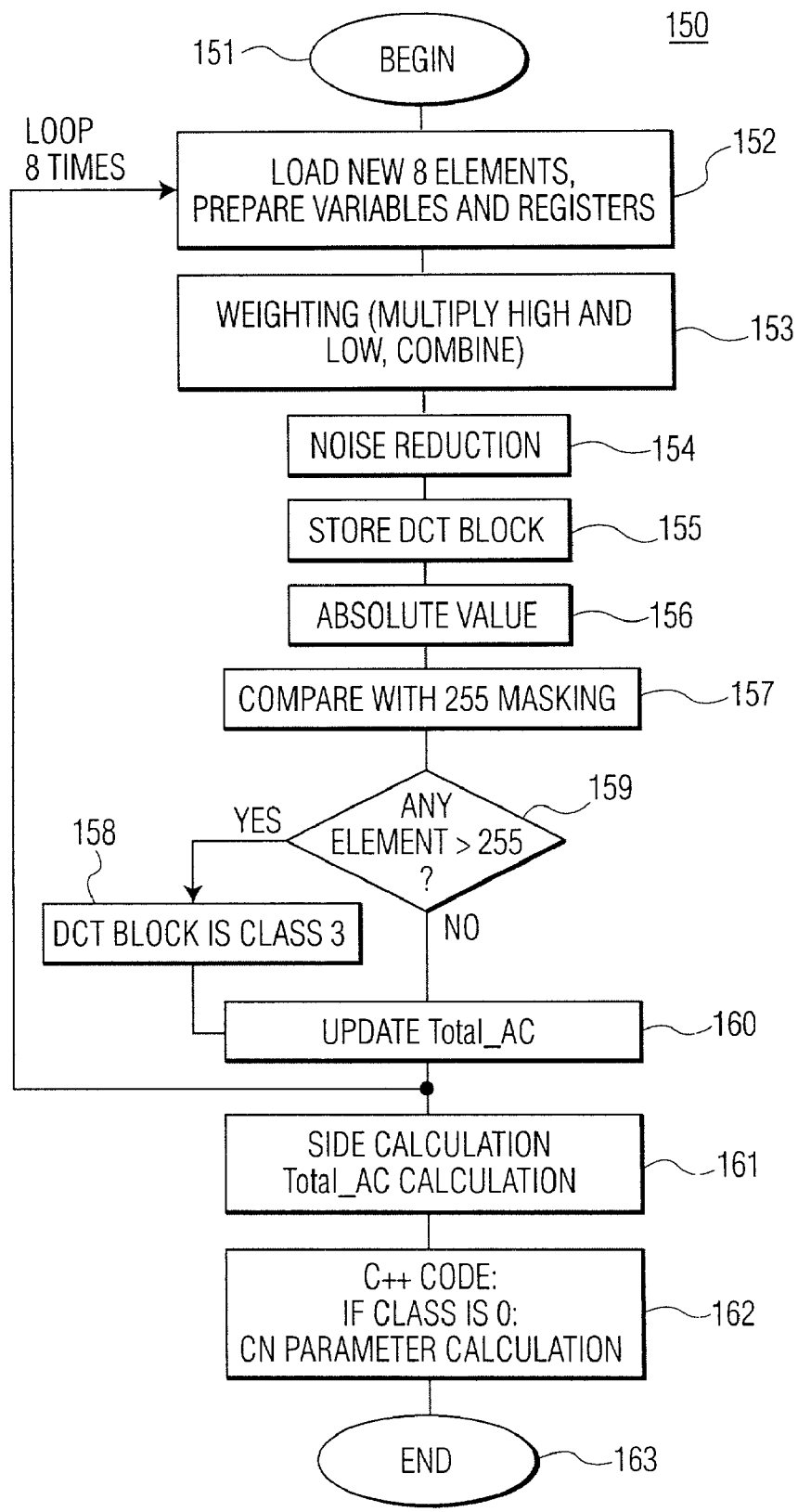
FIG. 15 is a flow diagram illustrating steps involved in a method of processing a DCT block of coefficients to obtain a classification number for the DCT block in accordance with an embodiment of the invention.

Referring to FIG. 15, there is shown a method for classifying a DCT block for digital video (DV) encoding. The method, designated as 150, begins in step 151 and, in general, determines a class number (CN) of the DCT block. It will be appreciated that the CN may be based on various design standards. For example, the CN may have an integer value between 0–3 and may depend on quantization noise and maximum absolute value of the AC coefficients of a DCT matrix, as shown in Table 4.

TABLE 4

Class Number and Quantization Noises

| Class Number | Quantization Noise | Maximum Absolute Value of AC Coefficient |
| --- | --- | --- |
| 0 | Visible | Less than or equal to 255 |
| 1 | Lower than class 0 | |
| 2 | Lower than class 1 | |
| 3 | Lower than class 2 | Greater than 255 |

Step 152 of the method loads, in parallel, 8-DCT coefficients (for example) into a 128-bit register. The register may be an XMM register (FIG. 8). By loading 8 coefficients in parallel, each having 16-bits, the register is packed with 128-bits. Similarly, step 152 loads, in parallel, 8 weighting elements into another 128-bit register. By loading 8 weighting elements in parallel, each having 16-bits, this register is also packed with 128-bits.

It will be appreciated that the 8 weighting elements form part of a weighting matrix (64 weighting elements) that may be used to scale down the DCT coefficients. The weighting matrix may be chosen by a design standard. Each DCT coefficient may then be multiplied by a corresponding weighting element from the weighting matrix.

Figure 16:
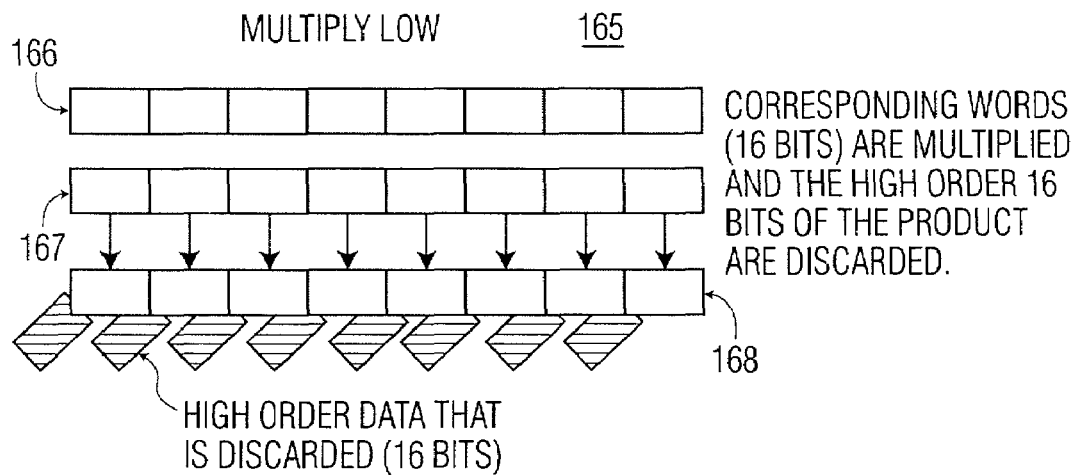
FIGS. 16 and 17 are schematic illustrations of multiplying words in one register with corresponding words in another register in accordance with an embodiment of the invention.
Figure 17:
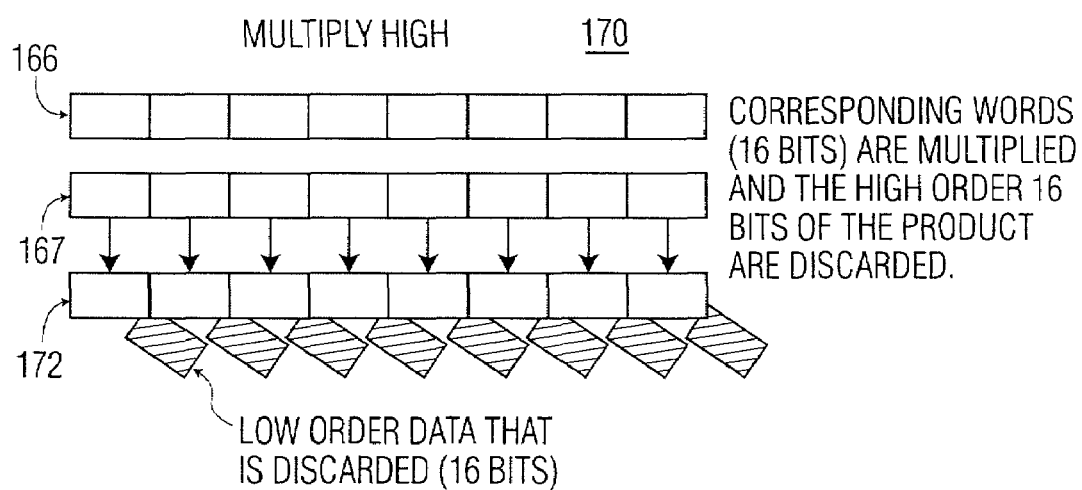

Step 153 multiplies the DCT coefficients with the corresponding weighting elements (pDCT×pW shown in Table 7). The multiplication may be performed as schematically shown in FIGS. 16 and 17. The 8-DCT coefficients (16-bits each) may be loaded into register 166 and the 8 weighting elements (16-bits each) may be loaded into register 167. Corresponding words (16-bits each) are multiplied and the high order 16 bits of the product are discarded. This is referred to as "multiply low" and is designated as 165 in FIG. 16. As shown, the high order bits are discarded and the low order bits may be stored in yet another 128-bit register (register 168). It will be appreciated that, generally, when 16-bits are multiplied by 16-bits, the product is 32-bits. Multiply low allows the low order bits to be saved.

In a similar manner, step 153 multiplies corresponding words (16-bits each) in registers 166 and 167 to produce a product in register 172 and the low order 16-bits of the product are discarded. This is referred to as "multiply high" and is designated as 170 in FIG. 17. By multiplying high and low, step 153 allows all the data to be saved (either the high 16-bits of a product or the low 16-bits of a product).

After multiplying high and low, step 153 combines the resultant data in register 168 with the resultant data in register 172. Combining the data is performed by (a) shifting the product in register 168 by 10-bits to the right, (b) shifting the product in register 172 by 6-bits to the left, and (c) combining the data in the registers by performing a bitwise-OR operation. The bits in register 168 are shifted right by 10-bits because of the approximation of the floating point multiplication using integers. Bits in register 172 are shifted left by 6-bits, so that when registers 168 and 172 are combined by bitwise-OR, the values correspond to each other.

Figure 18:
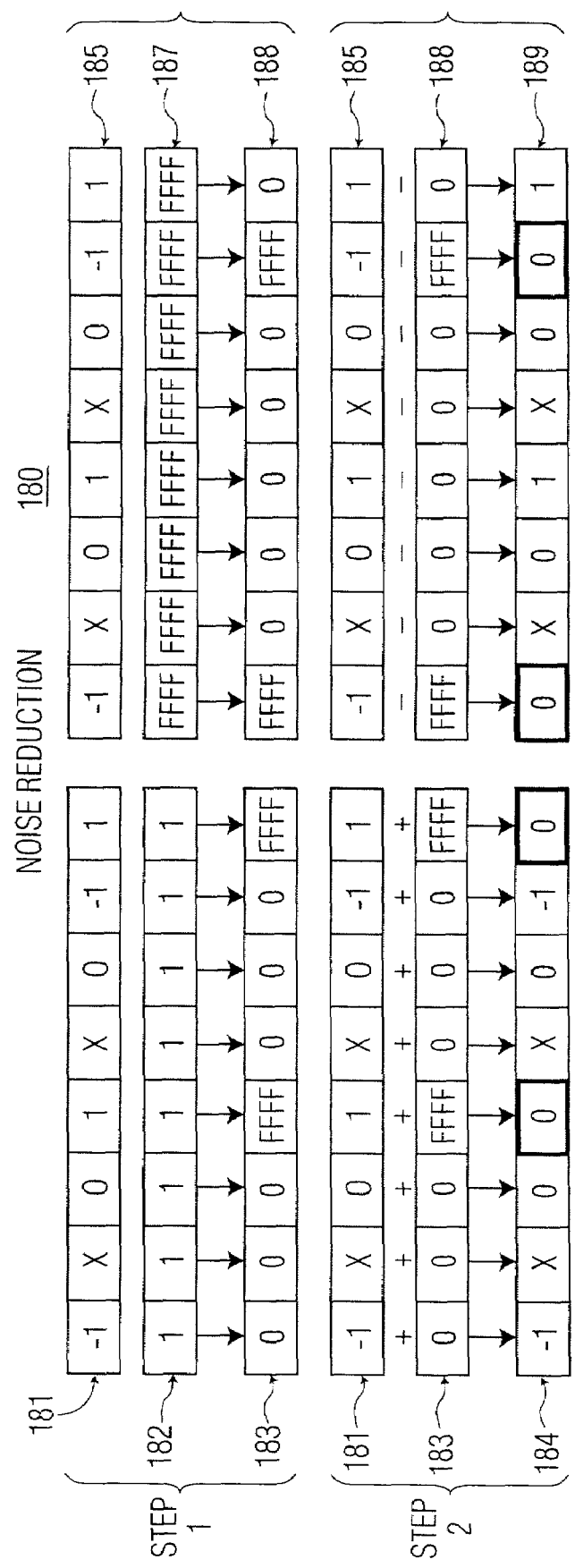
FIG. 18 is a schematic illustration of noise reduction in which DCT coefficients stored in a register having a +1 value or −1 value are located in accordance with an embodiment of the invention.

Returning to FIG. 15, after completing the weighting step, the method performs noise reduction in step 154. Noise reduction eliminates DCT coefficients having a value of +1 or −1. Noise reduction is schematically shown in FIG. 18 and is generally designated as 180. By way of example, 8-DCT coefficients, loaded in parallel into register 181, are compared to an array of "ones" loaded in parallel into register 182. The result of the comparison is "FFFF" (decimal for −1) for corresponding word elements that are the same and "zeros" for corresponding word elements that are not the same, as shown in register 183.

It will be appreciated that this comparison may be performed by an SSE2 instruction, PCMPEQW, which compares two XMM registers for equal words (16-bits, 2 bytes) and replaces the first operand with "ones", if the numbers are equal in corresponding words of the first and second register, and "zeros" if not equal.

After completing the comparison, the noise reduction step adds the result in register 183 to the DCT coefficients in register 181, producing the resultant words shown in register 184 (step 2). As shown, the DCT coefficients with a value of "1" in register 181 have now become "0". In this manner, the noise reduction step finds and eliminates the DCT coefficients having a value of +1.

In a similar manner, the noise reduction step may find and eliminate DCT coefficients having a value of "−1". Turning to the right side of FIG. 18, by way of example, a copy of the original 8-DCT coefficients is shown loaded into register 185 (8 word elements, 16-bits each). The 8-DCT coefficients are compared to an array of "FFFF" (decimal for −1) loaded into register 187. The result of the comparison is "FFFF" for corresponding word elements that are the same and "zeros" for corresponding word elements that are not the same, as shown in register 188.

After having completed the comparison, using an SSE2 instruction, PCMPEQW, the noise reduction step subtracts the result in register 188 from the DCT coefficients in register 185. This produces the resultant words shown in register 189. The DCT coefficients with a value of "−1" in register 185 have now become "0". In this manner, "−1" values may be eliminated.

Although not shown, it is contemplated that the noise reduction in step 154 may be performed prior to the run length value determination shown in FIG. 7, so that the run length values may be increased by eliminating coefficients having values of "+1" and "−1".

Returning to FIG. 15, the method enters step 155 and stores the DCT coefficients. The method then enters step 156 and computes the absolute value of each of the stored DCT coefficients. The absolute value may be computed using an algorithm from the Intel Software Manual. The method then enters step 157 and performs a "compare with 255" operation and a "masking" operation, as explained below.

Figure 19:
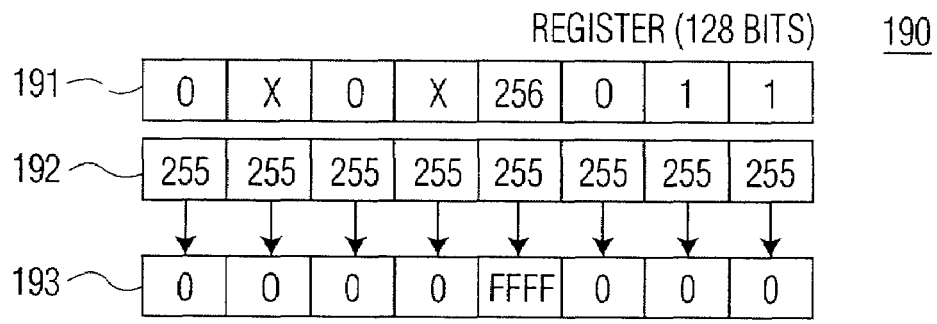
FIGS. 19–21 are schematic illustrations of steps for comparing DCT coefficients stored in a register with values of 255 stored in another register, masking results of the comparison, and performing a bitwise-AND operation for setting a class number of a DCT block in accordance with an embodiment of the invention.
Figure 20:
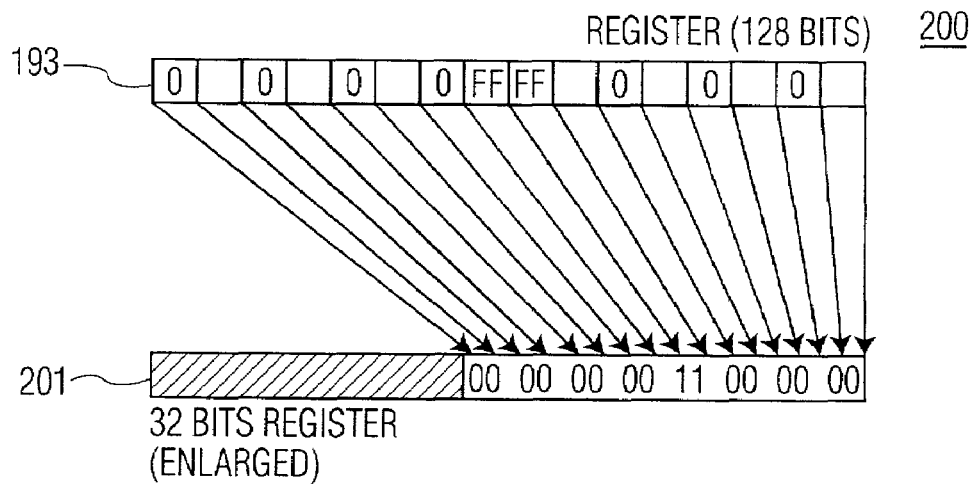

The "compare with 255" operation is shown schematically in FIG. 19 and is generally designated as 190. The "compare with 255" operation finds whether any DCT coefficient has an absolute value greater than 255. It will be appreciated that, in accordance with the DV standard, if a DCT coefficient has an absolute value greater than 255 in a DCT block (8×8 matrix), the CN may be set to 3.

The "compare with 255" operation may use a compare for greater instruction (PCMPGTW) that compares 8 corresponding 16-bit words (weighted and noise reduced absolute value) with an array of 8 words, each having a value of 255. By way of example, 8-DCT coefficients are shown loaded into register 191, which may be a 128-bit XMM register. The 8-DCT coefficients in register 191 are compared with an array of "255" in register 192. The result of the comparison is shown in register 193. Since the fourth DCT coefficient from the right in register 191 is greater than 255, the corresponding word in register 193 is filled with "ones" (FFFF). The remaining words in register 193 become "zeros".

Step 157 performs a "masking" operation, after the "compare with 255" operation. As shown schematically in FIG.

20 and described above, the masking operation 200 takes the first bit of every byte in register 193 and stores it into the last 16-bits of register 201. Register 201 may be a 32-bit register, such as an EAX register. Accordingly, the "FFFF"word (2 bytes) in register 193 becomes "11", positioned as shown in register 201.

Figure 21:
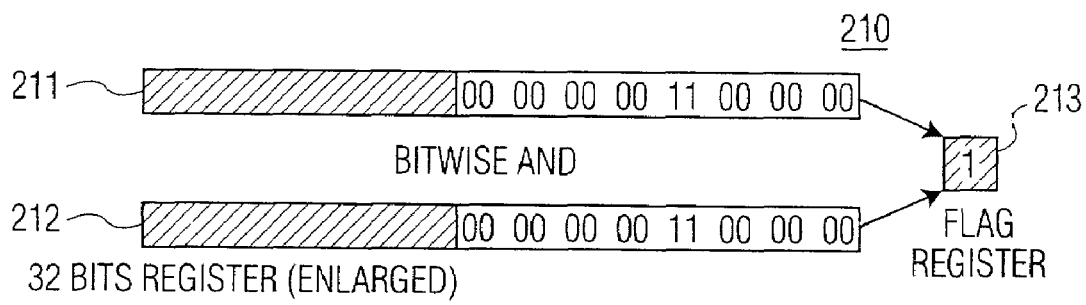

The next step, shown in FIG. 21 is a bitwise-AND operation, generally designated as 210, and may be performed as part of a conditional branch that sets CN to non zero. The bitwise-AND operation compares a 32-bit register with itself (shown schematically as two registers 211 and 212). If all the data in the register is zero, then FLAG register 213 may be set to "zero", otherwise the FLAG may be set to "one". If the FLAG is "one", CN may be set to 3.

Decision box 159 is entered to determine whether any DCT coefficient is greater than 255 (as described previously). If any DCT coefficient in the block is greater than 255, the method sets CN to 3. The total AC value (described below) of the 8-DCT coefficients is updated in step 160. The method loops back to step 152 and loads the next 8-DCT coefficients from the block. The method repeats the process of weighting, noise reduction, absolute value calculation, compare with 255, masking, and total AC value update. This process is repeated 8 times, until all 64-DCT coefficients have been processed. The total AC value for the DCT block is computed in step 161. Also computed in step 161 is the AC value of the horizontal side and vertical side of the DCT block (described below).

Figure 22:
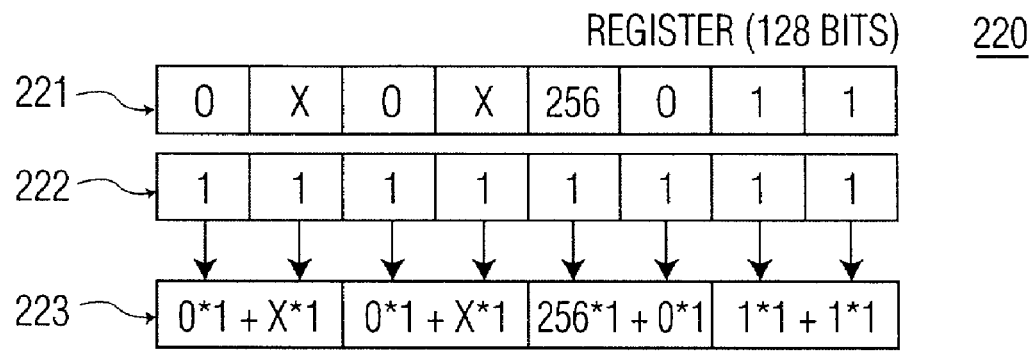
FIGS. 22–24 are schematic illustrations of steps for obtaining a total AC value of 8 DCT coefficients stored in a first register by copying the stored values into a second register, shifting the copied values in the second register and adding the values in the first register with the shifted values in the second register in accordance with an embodiment of the invention.
Figure 23:
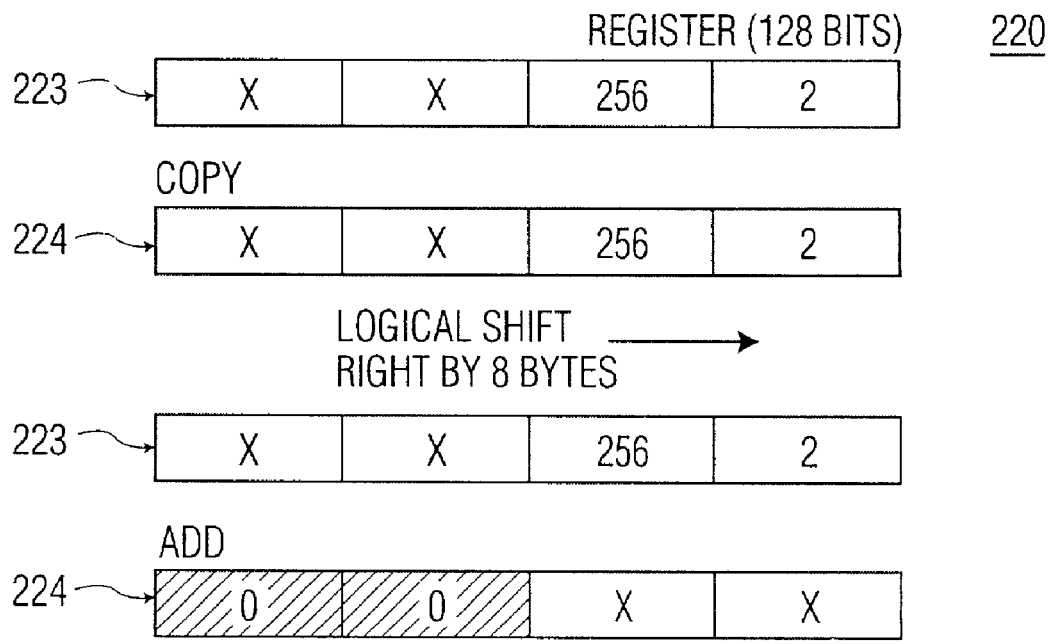
Figure 24:
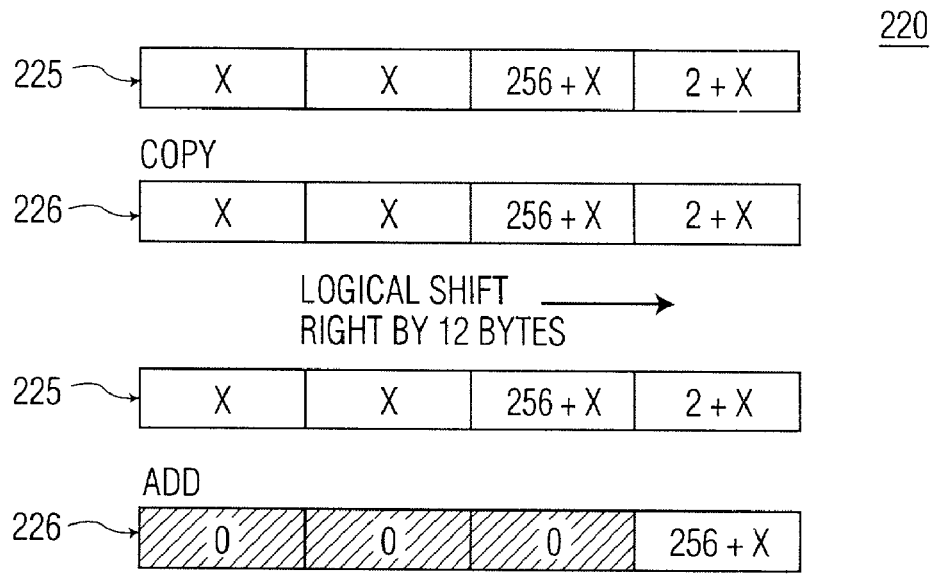

Total AC value will now be described. The total AC value is the sum of the absolute values of the weighted DCT block coefficients, excluding the DC coefficient. The manner in which the total AC value of 8-DCT coefficients may be computed is schematically shown in FIGS. 22–24 and is generally designated as 220. As an example, register 221 (128-bit register) is shown loaded with 8-DCT coefficients. A packed multiply add instruction (PMADDWD) may be used to unpack the 8 coefficients (16-bits each) into four double words (32-bits each). An array of "ones" in register 222 is used so that the DCT coefficient values are not changed in the multiplication process. The result of the multiplication and addition is shown in register 223, which now contains four double words, having values of the first plus the second coefficients, the third plus the fourth coefficients, the fifth plus the sixth coefficients, and the seventh plus the eighth coefficients.

In order to combine the four double words in register 223 into two quad words, the method makes a copy of the data, as shown in register 224 of FIG. 23. The copied data is shifted by 8 bytes (2 double words) so that the top 2 double words are in position of the bottom 2 double words, as shown. The shifting may be performed by a PSRAW instruction that arithmetically shifts every word (16-bits, 2 bytes) of an XMM register to the right. The 2 double words in register 223 are added to the 2 shifted double words in register 224, as shown. The result of the addition is shown in register 225 of FIG. 24, which now contains the value of the first plus the third double words, and the value of the second plus the fourth double words in the last two cells of the register.

The method repeats the above process in order to combine the two quad words into a single word. In the example shown in FIG. 24, the method copies the data in register 225 into register 226. The copied data in register 226 may be shifted to the right by 6 words (12 bytes), using a PSRLDQ instruction. The PSRLDQ is a packed shift right logical double quadword instruction which shifts 128-bits of data in an XMM register to the number of bytes presented in the second operand. The two quad words are added to obtain a total AC value of the 8 coefficients of (2+X)+(256+X).

Figure 26:
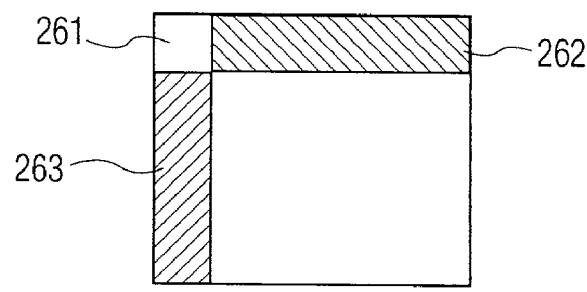
FIG. 26 is an illustration of a DCT block of coefficients, highlighting a first row and a first column of the block.

Returning to FIG. 15, step 161 calculates the value of the horizontal side and the value of the vertical side. The value of the horizontal side is the AC value (weighted) of the seven DCT coefficients in the first row of a DCT block, as shown in FIG. 26. The first row is depicted as 262 and excludes DC coefficient 261. The value of the vertical side is the AC value (weighted) of the DCT coefficients in the first column of a DCT block. As shown, the first column is depicted as 263 and excludes DC coefficient 261.

Figure 25:
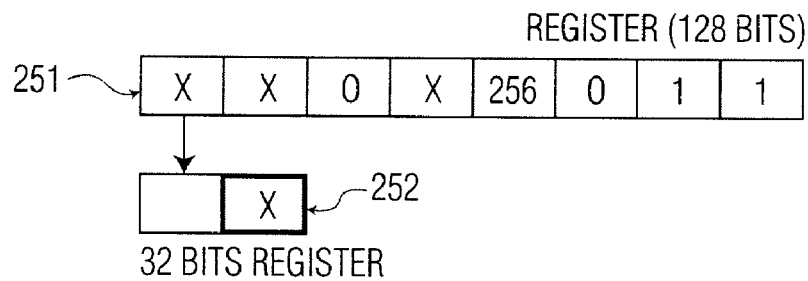
FIG. 25 is a schematic illustration of extracting a first word (16-bits) in a 128-bit register and storing the extracted bits in another register in accordance with an embodiment of the invention.

The method calculates the value of the horizontal side as part of the total AC computation described before. The value of the vertical side, however, is extracted from the packed total AC's first word, as shown in FIG. 25. The first word in register 251 (for example) may be extracted using a PEXTRW instruction to extract a word (16-bits) from an XMM register and place it into register 252. It will be appreciated that register 252 may be a general purpose 32-bit register. The PEXTRW instruction uses a key (hex number) as a third operand to extract a 16-bit word from the XMM register corresponding to that key value and place it into the 32-bit register (first operand).

After the total AC value, horizontal side value and vertical side value have been determined for a DCT block, the method calculates the side value in step 161. Side value is a sum of the horizontal side value and the vertical side value, excluding the DC coefficient value. The method may then use these values in step 162 to determine a class number (CN). The method ends in step 163.

The CN value may be computed as follows:

CN=Class Table [Chroma, i1, i2]

where Class Table is a 3×3×4 integer array with the values shown in Table 5.

TABLE 5

| | |
|---|---|
| 0, 1, 1, 1 | Chroma = 0 |
| 0, 1, 2, 2, | |
| 0, 1, 2, 3, | |
| 1, 2, 2, 2, | Chroma = 1 |
| 2, 2, 3, 3, | |
| 2, 3, 3, 3, | |
| 1, 1, 2, 2, | Chroma = 2 |
| 1, 2, 2, 3, | |
| 1, 2, 3, 3 | |

Chroma is a variable that indicates whether the DCT block being encoded is a luminance (Y) component block or a U or V chrominance component block. In other words, Chroma=0 for Y, Chroma=1 for U, and Chroma=2 for V. The values i1 and i2 are each integers computed using the algorihm shown in Table 6.

TABLE 6

| |
|---|
| center = (total_AC) − (side) |
| edge = (side) − (center) |
| if (DC ≧ 64), then i1 = 0; |
| else if (DC≧ 0 or edge ≧ 64), then i1 = 1; |
| else i1 = 2; |
| if (total_AC < 16), then i2 = 0; |
| else if (total_AC < 32), then i2 = 1; |
| else if (total_AC < 128), then i2 = 2; |
| else i2 = 3; | where, edge and center are each integers, DC is the DCT coefficient in the first row and first column, "side" is the summation of the DCT coefficients in the first row and first column, excluding the DC component; and "total_AC" is the summation of the DCT coefficients, excluding the DC component.

The SSE2 algorithm for DCT data classification 150, when embodied in an Intel Pentium 4 processor, is listed in Table 7. Definitions of various program parameters for the DCT data classification are provided in Table 8.

TABLE 7

DCT Data Classification Algorithm

| Code | Description |
|---|---|
| PCMPEQW XMM7, XMM7;<br>PCMPEQW XMM6,XMM6;<br>PCMPEQW XMM5,XMM5;<br>PSRLW XMM7, 8;<br>PSRLW XMM5,15; | Using compare if equal XMM5, XMM6 and XMM7 are set to FFFFs. XMM5 and XMM7 are then logically shifted to the right until specific value is reached. XMM7 is shifted until it contains an array of 255 (8 word elements, 16 Bits each) and XMM5 is shifted to become an array of 1nes (8 word elements, 16 Bits each). |
| MOV      EDI, pDCT     ; //pDCT coef. is in EDI<br>MOV      ESI, pW       ; //pW weighting matrix is in ESI | Pointers of the DCT Block matrix and Weighting matrix are loaded into the EDI and ESI registers. |
| MOVDQA   XMM0, [EDI]   ; //8 packed words (16 bit) | First 8 elements (short int) of the DCT Block matrix are loaded into the XMM0 register. |
| XOR      EAX, EAX      ; //EAX is used as the CN<br>XORPD    XMM3,XMM3     ; //XMM3 is set to 0; XMM3 will be Total_AC after loop | XOR instruction sets EAX to zero for the future use as CN (Class Number).<br>XORPD is an SSE2 instruction for the XMM registers which is similar to XOR and it is applied on XMM3 which is set to zero for the future use as packed Total_AC. |
| //--------------------LOOP WAS UNROLLED TO GAIN SPEED--------------------CLASS SELECTION # 1----------------//<br>MOVDQA   XMM1, [ESI]   ; //8 packed words (16bit)<br>MOVDQA   XMM2,XMM1     ; //copy of XMM1 is in XMM2 | 8 elements (short int, 16 Bits) of the Weighting matrix are loaded into the XMM1 and its copy is placed in XMM2. |
| //---------------------------------------Weighting------(pDCT[i]* pW[i])>>10----------------//<br>PMULLW   XMM1, XMM0    ; //XMM1 is now lower 16 bit (8 words)<br>PMULHW   XMM0, XMM2    ; //XMM0 is now higher 16 but (8 words) | Elements from Weighting coefficient matrix are multiplied low (high order 16 bits of the product are discarded) by the DCT Block matrix elements (8 words, 16 bits by corresponding 8 words, 16 Bits).<br>DCT Block matrix elements are multiplied high (Low order 16 Bits of the Product are discarded) by the Weighting coefficient matrix elements (8 words, 16 bits by corresponding 8 words, 16 Bits). |
| PSLLW    XMM0, 6       ; //shift XMM0 by 6 bit left<br>PSRLW    XMM1,10       ; //shift XMM1 by 10 bits right<br>POR      XMM0, XMM1    ; //bitwise OR transferring all data to the XMM0<br>//------------------------------------------------Weighting is done------------------------// | The resultant data of the multiplication is separated on high order 16 bits and low order 16 bits (XMM0 and XMM1). Since the Rule for the Weighting is DCT Block elements * Weighting coefficient >> 10, thus low order data (XMM1) have to be shifted by 10 Bits. In order for the high order data to seamlessly fit the shifted low order data it is shifted by 6 to the left and then two XMM registers are combined into one by packed OR instruction (POR). This way the Weighting formula is fully preserved in this parallel computation. |
| //Eliminate Noise [−1 and 1 from pDCT matrix]<br>MOVDQA XMM1, XMM0;<br>PCMPEQW XMM1, XMM6;<br>MOVDQA XMM2, XMM0;<br>PSUBSW XMM0,XMM1;<br>PCMPEQW XMM2, XMM5;<br>PADDW XMM0,XMM2; | Noise represents the values −1 and 1 which may be present in the resulting matrix data after the multiplication. Such values are negligible and thus can be zeroed.<br>To eliminate −1s, at fist the 8 elements in the Weighted DCT Block matrix are copied to XMM1, then compared with an array of 8 elements (words) of −1 (XMM6) using compare for equal instruction (PCMPEQW), which puts FFFF (or −1) values into the corresponding word element of Weighted DCT Block matrix if condition is met and 0 is not. Now XMM1 contains −1 for the corresponding −1 in the XMM0, by packed subtracting we can get rid of −1.<br>Similar method is applied for 1, except the compare if equal array is full of 1nes (XMM5) and after the −1 is put in the copy of the Weighted DCT Block matrix they are added to the 1nes to get rid of 1.<br>The final 8 elements (words, short int) of the Weighted and Noise Reduced DCT Block Matrix are stored back to the memory. |
| MOVDQA[EDI], XMM0    ;             //Move data back to the pDCT<br>//Input: XMM0: signed source operand, Output: XMM5: ABS(XMM0) | |
| MOVDQA XMM1,XMM0  ; //make a copy of x<br>PSRAW    XMM0,15       ; //replicate sign bit (use 31 if doing DWORDS)<br>PXOR     XMM1,XMM0     ; //take 1's complement of just the negative fields | This is an Absolute Value algorithm designed by Intel (in the MMX software manual) and modified for the SSE2 registers and instructions.<br>Input is XMM0 −8 elements of the Weighted and Noise Reduced DCT Block Matrix and output −8 absolute values of it in the XMM1. |

TABLE 7-continued

DCT Data Classification Algorithm

| | | | |
|---|---|---|---|
| PSUBSW | XMM1,XMM0 | ; //ADD 1 to just the negative fields | A copy of the Absolute Values is temporary stored for the side parameter calculation, which will appear at the bottom of the algorithm. This is done only once in the first unrolled loop because this data represents the horizontal side. |
| MOVDQA | XMM4, XMM1 | ; //copy for the side calculation | A copy of the 8 elements with Absolute values of the Weighted and Noise Reduced DCT Block Matrix are stored into XMM2, compared for greater with XMM7 (8 elements with 255 values), if greater then the XMM2 will have FFFF instead of a corresponding word (16 Bits, 1 element) and for words that are less then 255- they are set to 0. Then Byte Masking instruction (PMOVMSKB) is applied to get a fist bit of every byte from the XMM2, which can only contain 0 and Fs. Mask is saved in the lowest 16 Bits of the EDX. Bitwise OR instruction replicates 1nes (if present) to the EAX (reserved for the CN). The XMM3 (reserved for Total_AC) is added with the Absolute values elements. EDI pointer is updated for the DCT Block matrix. Next 8 elements are loaded into the XMM0 fore the second round of the Classification algorithm. |
| MOVDQA | XMM2,XMM1 | ; | |
| PCMPGTW | XMM2, XMM7 | ; //compare if ABS values are > then 255 | |
| PMOVMSKB | EDX, XMM2 | ; //Move bit mask (every byte) to the EBP | |
| OR | EAX,EDX | ; | |
| PADDW | XMM3, XMM1 | ; //ADD the ABS values to the total_AC (now packed) | |

//*** ABS OVER

```
ADD    EDI, 16           ; // Move by 1 byte in the matrixes
MOVDQA            XMM0, [EDI]; //8 packed words (16 bit)
//-------------------------------------------------------------------------CLASS SELECTION #2-------//
MOVDQA    XMM1, [ESI]+16  ; //8 packed words (16bit)
MOVDQA    XMM2,XMM1    ; //copy of XMM1 is in XMM2
PMULLW            XMM1, XMM0       ; // XMM1 is now lower 16 bit (8 words)
PMULHW            XMM0, XMM2       ; // XMM0 is now higher 16 but (8 words)
PSLLW     XMM0, 6        ; //shift xmm0by 6 bit left
PSRLW     XMM1,10        ; //shift XMM1 by 10 bits right
POR       XMM0, XMM1     ; //bitwise OR transferring all data to the XMM0
//Eliminate Noise [-1 and 1 from pDCT matrix]
               MOVDQA XMM1, XMM0;
               PCMPEQW XMM1, XMM6;
               MOVDQA XMM2, XMM0;
               PSUBSW XMM0,XMM1;
               PCMPEQW XMM2, XMM5;
               PADDW XMM0,XMM2;
MOVDQA    [EDI], XMM0     ; //Move data back to the pDCT
//Input: XMM0: signed source operand, Output: XMM5: ABS(XMM0)
MOVDQA    XMM1,XMM0     ; //make a copy of x
PSRAW             XMM0,15         ; //replicate sign bit (use 31 if doing DWORDS)
PXOR              XMM1,XMM0       ; //take 1's complement of just the negative fields
PSUBSW            XMM1,XMM0       ; //ADD 1 to just the negative fields
MOVDQA    XMM2,XMM1     ;
PCMPGTW   XMM2, XMM7    ; //compare if ABS values are > then 255
PMOVMSKB  EDX, XMM2     ; //Move bit mask (every byte) to the EBP
OR        EAX,EDX       ;
PADDW             XMM3, XMM1    ; //ADD the ABS values to the total_AC (now packed)
//*** ABS OVER
ADD   EDI, 16  ; //Move by 1 byte in the matrixes
MOVDQA    XMM0, [EDI]   ;           //8 packed words (16 bit)
//-------------------------------------------------------------------------CLASS SELECTION #3-------//
MOVDQA    XMM1, [ESI]+32  ; //8 packed words (16bit)
MOVDQA    XMM2,XMM1     ; //copy of XMM1 is in XMM2
PMULLW    XMM1, XMM0    ; //XMM1 is now lower 16 bit (8 words)
PMULHW    XMM0, XMM2    ; //XMM0 is now higher 16 but (8 words)
PSLLW     XMM0, 6       ; //shift xmm0by 6 bit left
PSRLW     XMM1,10       ; //shift XMM1 by 10 bits right
POR       XMM0, XMM1    ; //bitwise OR transferring all data to the XMM0
//Eliminate Noise [-1 and 1 from pDCT matrix]
               MOVDQA XMM1, XMM0;
               PCMPEQW XMM1, XMM6;
               MOVDQA XMM2, XMM0;
               PSUBSW XMM0,XMM1;
               PCMPEQW XMM2, XMM5;
```

!!!! Note there is a continuation of the side, CN and Total_AC calculations at the bottom of the algorithm, please look at the bottom of this document.
This is an effect of the performance optimization technique called loop unrolling. The following code represents a loop of 8 of the same code as above, but unrolled into 8 code blocks without loop presence.
All the data manipulation is done until the corresponding 64 short integer matrixes pointed by pW and pDCT are over.

TABLE 7-continued

DCT Data Classification Algorithm

```
                    PADDW XMM0,XMM2;
MOVDQA      [EDI], XMM0         ; //Move data back to the pDCT
//Input: XMM0: signed source operand, Output: XMM5: ABS(XMM0)
MOVDQA      XMM1,XMM0    ; //make a copy of x
PSRAW           XMM0,15          ; //replicate sign bit (use 31 if doing
DWORDS)
PXOR            XMM1,XMM0        ; //take 1's complement of just the negative
fields
PSUBSW          XMM1,XMM0        ; //ADD 1 to just the negative fields
MOVDQA      XMM2,XMM1         ;
PCMPGTW         XMM2, XMM7       ; //compare if ABS values are > then
255
PMOVMSKB        EDX, XMM2        ; //Move bit mask (every byte) to the
EBP
OR          EAX,EDX           ;
PADDW           XMM3, XMM1;      //ADD the ABS values to the total_AC
(now packed)
//*** ABS OVER
ADD  EDI, 16  ; //Move by 1 byte in the matrixes
MOVDQA      XMM0, [EDI];              //8 packed words (16 bit)
//------------------------------------------------------------------------------------CLASS
SELECTION # 4-------//
MOVDQA      XMM1, [ESI]+48        ; //8 packed words (16bit)
MOVDQA      XMM2,XMM1             ; //copy of XMM1 is in XMM2
PMULLW          XMM1, XMM0        ; //XMM1 is now lower 16 bit (8
words)
PMULHW          XMM0, XMM2        ; //XMM0 is now higher 16 but (8
words)
PSLLW           XMM0, 6           ; //shift xmm0by 6 bit left
PSRLW           XMM1,10           ; //shift XMM1 by 10 bits right
POR             XMM0, XMM1        ; //bitwise OR transferring all data to the
XMM0
//Eliminate Noise [-1 and 1 from pDCT matrix]
                    MOVDQA XMM1, XMM0;
                    PCMPEQW XMM1, XMM6;
                    MOVDQA XMM2, XMM0;
                    PSUBSW XMM0,XMM1;
                    PCMPEQW XMM2, XMM5;
                    PADDW XMM0,XMM2;
MOVDQA      [EDI], XMM0         ; //Move data back to the pDCT
//Input: XMM0: signed source operand, Output: XMM5: ABS(XMM0)
MOVDQA      XMM1,XMM0    ; //make a copy of x
PSRAW           XMM0,15          ; //replicate sign bit (use 31 if doing
DWORDS)
PXOR            XMM1,XMM0        ; //take 1's complement of just the negative
fields
PSUBSW          XMM1,XMM0        ; //ADD 1 to just the negative fields
MOVDQA      XMM2,XMM1      ;
PCMPGTW         XMM2, XMM7   ;   //compare if ABS values are > then 255
PMOVMSKB        EDX, XMM2    ;         //Move bit mask (every byte) to
the EBP
OR          EAX,EDX           ;
PADDW           XMM3, XMM1        ; //ADD the ABS values to the total_AC
(now packed)
//*** ABS OVER
ADD  EDI, 16;        //Move by 1 byte in the matrixes
//ADD ESI, 16; //
MOVDQA      XMM0, [EDI];     //8 packed words (16 bit)
//------------------------------------------------------------------------------------CLASS
SELECTION # 5-------//
MOVDQA      XMM1, [ESI]+64        ; //8 packed words (16bit)
MOVDQA      XMM2,XMM1             ; //copy of XMM1 is in XMM2
PMULLW          XMM1, XMM0        ; //XMM1 is now lower 16 bit (8 words)
PMULHW          XMM0, XMM2        ; //XMM0 is now higher 16 but (8
words)
PSLLW           XMM0, 6   ;    //shift xmm0by 6 bit left
PSRLW           XMM1,10           ; //shift XMM1 by 10 bits right
POR             XMM0, XMM1  ; //bitwise OR transferring all data to the XMM0
//Eliminate Noise [-1 and 1 from pDCT matrix]
                    MOVDQA XMM1, XMM0;
                    PCMPEQW XMM1, XMM6;
                    MOVDQA XMM2, XMM0;
                    PSUBSW XMM0,XMM1;
                    PCMPEQW XMM2, XMM5;
                    PADDW XMM0,XMM2;
MOVDQA      [EDI], XMM0   ;            //Move data back to the pDCT
//Input: XMM0: signed source operand, Output: XMM5: ABS(XMM0)
```

TABLE 7-continued

DCT Data Classification Algorithm

```
MOVDQA      XMM1,XMM0      ; //make a copy of x
PSRAW            XMM0,15           ; //replicate sign bit (use 31 if doing DWORDS)
PXOR        XMM1,XMM0      ; //take 1's complement of just the negative fields
PSUBSW      XMM1,XMM0      ; //ADD 1 to just the negative fields
MOVDQA      XMM2,XMM1      ;
PCMPGTW     XMM2, XMM7     ; //compare if ABS values are > then 255
PMOVMSKB    EDX, XMM2      ; //Move bit mask (every byte) to the EBP
OR          EAX,EDX        ;
PADDW            XMM3, XMM1           ; //ADD the ABS values to the total_AC (now packed)
//*** ABS OVER
ADD   EDI, 16   ; //Move by 1 byte in the matrixes
//ADD ESI, 16  ; //
MOVDQA      XMM0, [EDI];   //8 packed words (16 bit)
//------------------------------------------------------------------------CLASS SELECTION # 6-------//
MOVDQA      XMM1, [ESI]+80 ;          //8 packed words (16bit)
MOVDQA      XMM2,XMM1      ;          //copy of XMM1 is in XMM2
PMULLW           XMM1,XMM0       ; //XMM1 is now lower 16 bit (8 words)
PMULHW           XMM0, XMM2      ; //XMM0 is now higher 16 but (8 words)
PSLLW            XMM0, 6         ; //shift xmmo by 6 bit left
PSRLW       XMM1,10        ;          //shift XMM1 by 10 bits right
POR              XMM0, XMM1      ; //bitwise OR transfering all data to the XMM0
//Eliminate Noise [-1 and 1 from pDCT matix]
                MOVDQA XMM1, XMM0;
                PCMPEQW XMM1, XMM6;
                MOVDQA XMM2, XMM0;
                PSUBSW XMM0,XMM1;
                PCMPEQW XMM2, XMM5;
                PADDW XMM0,XMM2;
MOVDQA      [EDI], XMM0; //MOve data back to the pDCT
//Input: XMM0: signed source operand, Output: XMM5: ABS(XMM0)
MOVDQA      XMM1,XMM0      ; //make a copy of x
PSRAW            XMM0,15           ; //replicate sign bit (use 31 if doing DWORDS)
PXOR             XMM1,XMM0       ; //take 1's complement of just the negative fields
PSUBSW           XMM1,XMM0       ; //ADD 1 to just the negative fields
MOVDQA      XMM2,XMM1      ;
PCMPGTW     XMM2, XMM7     ; //compare if ABS values are > then 255
PMOVMSKB    EDX, XMM2                ; //MOVe bit mask (evry byte) to the EBP
OR          EAX,EDX        ;
PADDW            XMM3, XMM1           ; //ADD the ABS values to the total_AC (now packed)
//*** ABS OVER
ADD   EDI, 16  ; //MOVe by 1 byte in the matrixes
ADD   ESI, 96  ; //
MOVDQA      XMM0, [EDI];             //8 packed words (16 bit)
//------------------------------------------------------------------------CLASS SELECTION # 7-------//
MOVDQA      XMM1, [ESI]    ; //8 packed words (16bit)
MOVDQA      XMM2,XMM1;     //copy of XMM1 is in XMM2
PMULLW      XMM1, XMM0     ; //XMM1 is now lower 16 bit (8 words)
PMULHW      XMM0, XMM2     ; //XMM0 is now higher 16 but (8 words)
PSLLW            XMM0, 6              ; //shift xmm0 by 6 bit left
PSRLW            XMM1,10              ; //shift XMM1 by 10 bits right
POR         XMM0, XMM1     ; //bitwise OR transferring all data to the XMM0
//Eliminate Noise [-1 and 1 from pDCT matrix]
                MOVDQA XMM1, XMM0;
                PCMPEQW XMM1, XMM6;
                MOVDQA XMM2, XMM0;
                PSUBSW XMM0,XMM1;
                PCMPEQW XMM2, XMM5;
                PADDW XMM0,XMM2;
MOVDQA      [EDI], XMM0;             //Move data back to the pDCT
//Input: XMM0: signed source operand, Output: XMM5: ABS(XMM0)
MOVDQA      XMM1,XMM0      ; //make a copy of x
PSRAW            XMM0,15           ; //replicate sign bit (use 31 if doing DWORDS)
PXOR             XMM1,XMM0       ; //take 1's complement of just the negative fields
PSUBSW      XMM1,XMM0      ; //ADD 1 to just the negative fields
```

TABLE 7-continued

DCT Data Classification Algorithm

```
MOVDQA      XMM2,XMM1                ;
PCMPGTW     XMM2, XMM7               ;    //compare if ABS values are >
then 255
PMOVMSKB    EDX, XMM2                ;            //Move bit
mask (every byte) to the EBP
OR          EAX,EDX       ;
PADDW              XMM3, XMM1        ; //ADD the ABS values to the
total_AC (now packed)
//*** ABS OVER
ADD  EDI, 16  ; //Move by 1 byte in the matrixes
//ADD ESI, 16  ; //
MOVDQA      XMM0, [EDI];             //8 packed words (16 bit)

//------------------------------------------------------------------CLASS
SELECTION # 8-------//

MOVDQA      XMM1, [ESI]+16           ; //8 packed words (16bit)
MOVDQA      XMM2,XMM1                ; //copy of XMM1 is in XMM2
PMULLW             XMM1, XMM0        ; //XMM1 is now lower 16 bit (8
words)
PMULHW             XMM0, XMM2        ; //XMM0 is now higher 16 but (8
words)
PSLLW       XMM0, 6       ; //shift xmmo by 6 bit left
PSRLW              XMM1,10           ; //shift XMM1 by 10 bits right
POR                XMM0, XMM1        ; //bitwise OR transfering all data to
the XMM0

//Eliminate Noise [-1 and 1 from pDCT matix]
            MOVDQA XMM1, XMM0;
            PCMPEQW XMM1, XMM6;
            MOVDQA XMM2, XMM0;
            PSUBSW XMM0,XMM1;
            PCMPEQW XMM2, XMM5;
            PADDW XMM0,XMM2;

MOVDQA      [EDI], XMM0   ;          //MOVe data back to the pDCT

//Input: XMM0: signed source operand, Output: XMM5: ABS(XMM0)
MOVDQA      XMM1,XMM0                ; //make a copy of x
PSRAW              XMM0,15           ; //replicate sign bit (use 31 if doing
DWORDS)
PXOR               XMM1,XMM0         ; //take 1's complement of just the
negative fields
PSUBSW             XMM1,XMM0         ; //ADD 1 to just the negative fields
MOVDQA      XMM2,XMM1     ;
PCMPGTW     XMM2, XMM7    ;          //compare if ABS values are > then 255
PMOVMSKB    EDX, XMM2     ;          //MOVe bit mask (evry byte) to the EBP
OR          EAX,EDX       ;
PADDW       XMM3, XMM1    ;              //ADD the ABS values to the
total_AC (now packed)
//*** ABS OVER
// ADD              EDI, 16          ; //MOVe by 1 byte in the matrixes
//                  ADD
                    ESI, 16
//                                   ;
// MOVDQA    XMM0, [EDI;              //8 packed words (16 bit)
//--------------------------------------------------------------CLASS SELECTION
DONE-------//
and EAX,EAX;
jz cn_is3;
MOV EAX,3;
cn_is3:
//and              EAX,3;                     //compare if CN is
0, if 0 then z flag is 0
//jnz AC_no_count;    //jump to no_count if CN=3 no total_AC calculation;
pextrw      EDX, XMM3, 7h  ;
pmADDwd     XMM3, XMM5               ; //multiply with 8 singles to get 4 32bit
sums
MOVDQA      XMM2,XMM3     ;
psrldq             XMM2,8            ;
pADDd              XMM3, XMM2        ;
MOVDQA      XMM2,XMM3     ;
psrldq             XMM2, 4           ;
pADDd              XMM3,XMM2         ;
MOVD               total_AC, XMM3    ; //Move the unpacked data to
total_AC
//for side
```

Simple branch comparing if EAX is 0, if yes then EAX is set to 3.

The first word (16 Bits) of the Total_AC is extracted with the PEXTRW instruction and saved to EDX for the vertical part of the side parameter calculation (see reference page, side).

This part represents the unpacking operation of the XMM3 (reserved for Total_AC). 8 elements (words, 16 Bits) are to become a single value.
To do that firstly the XMM3 register undergoes vector multiplication with a register containing a word array of 1nes (0001)-XMM5. This is done intentionally so the data stays the same. (A*1 = A)
XMM3 now contains 4 doublewords (32 Bits) with $1^{st}$ and $2^{nd}$ product, $3^{rd}$ and $4^{th}$, $5^{th}$ and $6^{th}$, $7^{th}$ and $8^{th}$ values in different cells.
XMM3 is copied to XMM2, XMM2 shifted to the right so that the high order placed data moves to the low order, thus when added back to XMM3, XMM3 will now contain the sum of both high and low level data in its cells.

This is the same method as used for the Total_AC calculation (above). After the result is stored in Side variable, the vertical side part from EDX is added.

CN value is stored to the memory.

TABLE 7-continued

DCT Data Classification Algorithm

```
pmADDwd     XMM4, XMM5    ; //multiply with 8 singles to get 4 32bit sums
MOVDQA      XMM1,XMM4     ;
Psrldq             XMM1,8         ;
pADDd              XMM4, XMM1     ;
MOVDQA      XMM1,XMM4     ;
psrldq             XMM1,4         ;
pADDd              XMM4,XMM1      ;
MOVd        side, XMM4    ;
ADD         side, EDX     ;
//AC_no_count:
MOV         CN,EAX;
```

TABLE 8

Program References for DCT Data Classification

XMM0–XMM7 128 bits register used with SSE2 instructions to calculate packed data.
PXOR exclusive bit OR instruction that compares packed elements in two XMM registers.
PMOVMSKB byte mask instruction stores a first bit from every byte of the XMM register into the second half of a general purpose EAX register.
PCMPEQW compare for equal SSE2 instruction compares two XMM registers for equal words (16 Bits, 2 Bytes) and replaces the first operand with the 1 nes if the numbers are equal in the corresponding words of the first and second register and to 0 if not.
PSRAW-shifting instruction that arithmetically shifts every word (16 Bits, 2 bytes) of the XMM register to the right. The empty high-order bits of each element are filled with the initial value of the sign bit of the data element. If the value specified by the count operand is greater than 15 each destination data element is filled with the initial value of the sign bit of the element.
PMADDWD-Packed Add multiply that takes in two operands and proceeds with an operation similar to vector multiplication (Products: 1 + 2, 3 + 4, 5 + 6, 7 + 8 are combined after multiplication).
PEXTRW-Extract Word Instruction that using specific key (Hexadecimal number) as a third operant extracts the word (16 Bits) from an XMM register corresponding to that key value into a general purpose 32 Bits register (first operand).
MOVDQA-Move Aligned Double Quadword instruction that takes 128 Bits of aligned (16 Byte alignment is necessary) data from the memory and stores it in the XMM register.
PSRLDQ-Packed Shift Right Logical Double Quadword instruction shifts 128 Bits of data in the XMM register to the number of Bytes (not Bits) presented in the second operand.
pDCT = a pointer to the DCT Block matrix.
pW = a pointer to the Weighting coefficient matrix.
DCT Block = 64 short integer matrix representing an 8 by 8 block in a frame of the video file.
Class Number (CN) = Class number of the DCT Block. In the assembly CN is represented by EAX register.
Total AC = Sum of the absolute values of the Weighted DCT Block coefficients. The packed Total_AC (parallel sum of the 8 XMM registers) has to be unpacked so that 8 packed 16 Bits words are added together to get one Total_AC value.
Side = consists of a horizontal side and vertical, side is a sum of horizontal and vertical. The horizontal side is a summed first horizontal line of the Weighted Matrix coefficients (DC is not included). The vertical side is a summed first vertical line of the Weighted Matrix coefficients (DC is not included).

C. Dequantization Computation

Figure 27:
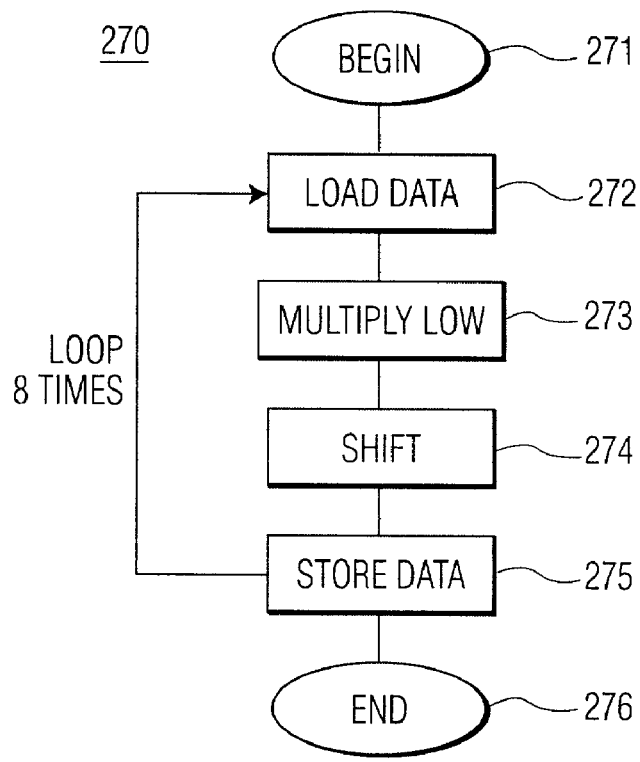
FIG. 27 is a flow diagram illustrating steps involved in a method of processing a DCT block of coefficients to obtain a dequantized block of coefficients in accordance with an embodiment of the invention.

Referring to FIG. 27, there is shown a method for dequantization computation. The method, generally designated as 270, begins in step 271, and dequantizes raw DCT coefficients that have been decoded by a variable length decoder. The method multiples corresponding values of three matrices, namely, a quantized DCT matrix, a dequantization coefficient matrix and a scale factor matrix. The scale factor matrix is a matrix whose elements are all set to a single value.

In step 272, the method loads data into three registers. Each register may be, for example, an XMM register which stores 128-bits in parallel. In the exemplary embodiment, 8 short integers (i. e. each 16 bit values) are loaded in parallel into each of the XMM registers, namely 8 short integers of the quantized DCT matrix, 8 short integers of the dequantization coefficient matrix and 8 short integers of the scale factor matrix.

In step 273, the method multiplies 8 short integers of the quantized DCT matrix (pointed to by pOrigin) with corresponding 8 short integers of the dequantization coefficient matrix (pointed to by pQuan_step) and then by 8 short integers of the scale factor matrix (pointed to by pScale). It will be appreciated that the dequantization coefficient matrix may be similar to the weighting matrix described in the classification computation algorithm. The scale factor may be determined earlier in the program.

The elements in the three registers are multiplied low, as described in the classification computation algorithm. The corresponding elements (16-bits) are multiplied and the high order 16-bits of the product is discarded. This is performed twice so that every element, in the exemplary embodiment, is as follows:

pOrigin[i]=pOrigin[i]*pQuan_step[i]*pScale[i]

Figure 28:
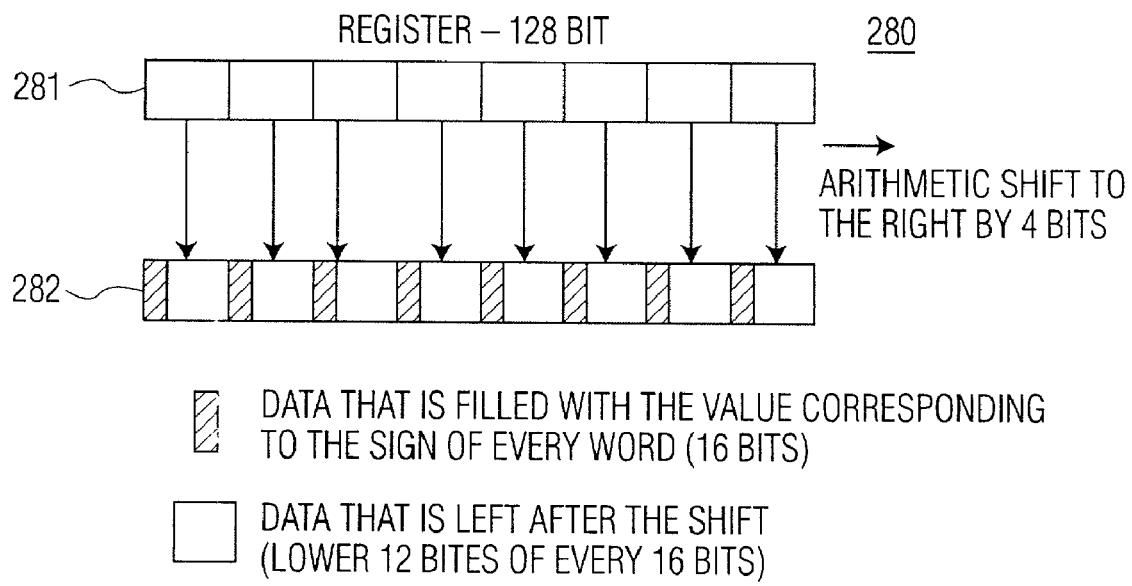
FIG. 28 is a schematic illustration of shifting values in a register by 4-bits to the right for performing a divide-by-a-factor-of-16 operation in accordance with an embodiment of the invention.

The method then shifts the pOrigin elements by 4-bits to the right in step 274. The shift by 4-bits is equivalent to dividing by a factor of 16 and implements a dequantization rule. The shift to the right is schematically shown in FIG. 28 and is generally designated as 280. As shown, the bits in register 281 are shifted to the right, producing shifted data as shown (for example) in register 282. The method may use a PSRAW instruction which arithmetically shifts every word (16 Bits, 2 bytes) of an XMM register to the right. The empty high-order bits of each element are filled with the initial value of the sign bit of the data element. If the value specified by the count operand is greater than 15, each destination data element is filled with the initial value of the sign bit of the element.

The SSE2 algorithm for dequantization computation, when embodied in an Intel Pentium 4 processor, is listed in Table 9. Definitions of various program parameters for the dequantization computation are provided in Table 10.

TABLE 9

| Dequantization Computation Algorithm | | | |
|---|---|---|---|
| mov esi,pOrigin | ; | | The pointers are loaded into ESI, EDI, EAX. This is done because SSE2 cannot load the data directly from the pointer to the variables, only from registers that contain them. |
| | mov edi,pQuan_step | ; | |
| | mov eax, pScale | ; | |
| movdqa xmm2, [eax]; | | | pScale value is an array of 8 elements that represent a coefficients. XMM2 now has 8 packed 16 Bit values. |
| movdqa | xmm0,[esi]; | | 8 elements in the pOrigin and pQuan_step are loaded into XMM0 and XMM1 respectively. They are 16Bits short int values like XMM2. |
| | movdqa | xmm1,[edi]; | |
| pmullw | xmm0,xmm1; | | Low Multiply instruction (PMULLW) multiplies the corresponding word (16 Bits) elements in the XMM0 and XMM1 and stores the product in XMM0 discarding the high order 16 Bits. (High order Bits appear because in the assembly 16Bits multiplied by 16 Bits returns a product of 32 Bits, thus in order for the data to be put pack in the same type multiply high and low instructions were created). |
| pmullw | xmm0,xmm2; | | |
| psraw | xmm0, 4; | | Low Multiply instruction (PMULLW) multiplies the corresponding word (16 Bits) elements in the XMM0 and XMM2 and stores the product in XMM0 discarding the high order 16 Bits. The Arithmetic Bit Shift to the Right instruction (PSRAW) shifts the XMM0 8 packed elements to the right according to the mpeg dequantization rule. |
| movdqa [esi],xmm0; | | | The Data is stored back to the memory. |
| | movdqa | xmm0,[esi]+16; | |
| | movdqa | xmm1,[edi]+16; | |
| | pmullw | xmm0,xmm1; | The following code is a result of an optimizing technique "loop unrolling" which was done for performance issues. The pointers are updated until the end of the matrix is reached ([register]+16n, where n is from 0 to 7). Some places have switched register names but the order and the algorithm is the same as described above. |
| | pmullw | xmm0,xmm2; | |
| | psraw | xmm0, 4; | |
| | movdqa | [esi]+16,xmm0; | |
| | movdqa | xmm0,[esi]+32; | |
| | movdqa | xmm1,[edi]+32; | |
| | pmullw | xmm0,xmm1; | |
| | pmullw | xmm0,xmm2; | |
| | psraw | xmm0, 4; | |
| | movdqa | [esi]+32,xmm0; | |
| | movdqa | xmm0,[esi]+48; | |
| | movdqa | xmm1,[edi]+48; | |
| | pmullw | xmm0,xmm1; | |
| | pmullw | xmm0,xmm2; | |
| | psraw | xmm0, 4; | |
| | movdqa | [esi]+48,xmm0; | |
| | movdqa | xmm0,[esi]+64; | |
| | movdqa | xmm1,[edi]+64; | |
| | pmullw | xmm0,xmm1; | |
| | pmullw | xmm0,xmm2; | |
| | psraw | xmm0, 4; | |
| | movdqa | [esi]+64,xmm0; | |
| | movdqa | xmm0,[esi]+80; | |
| | movdqa | xmm1,[edi]+80; | |
| | pmullw | xmm0,xmm1; | |
| | pmullw | xmm0,xmm2; | |
| | psraw | xmm0, 4; | |
| | movdqa | [esi]+80,xmm0; | |
| | add esi,96; | | |
| | add edi,96; | | |
| | movdqa | xmm0,[esi]; | |
| | movdqa | xmm1,[edi]; | |
| | pmullw | xmm0,xmm1; | |
| | pmullw | xmm0,xmm2; | |
| | psraw | xmm0, 4; | |
| | movdqa | [esi],xmm0; | |
| | movdqa | xmm0,[esi]+16; | |
| | movdqa | xmm1,[edi]+16; | |
| | pmullw | xmm0,xmm1; | |

TABLE 9-continued

Dequantization Computation Algorithm

| | |
|---|---|
| pmullw | xmm0,xmm2; |
| psraw | xmm0, 4; |
| movdqa | [esi]+16,xmm0; |

TABLE 10

Program References for Dequantization.

pOrigin = pointer to the beginning of the quantized DCT block.
pQuan_step = pointer to the beginning of the DEquantization coefficient matrix (similar to Weighting Matrix in Classification algorithm)
pScale = Quantization scale factor determined earlier in the program.
PSRAW-shifting instruction that arithmetically shifts every word (16 Bits, 2 bytes) of the XMM register to the right. The empty high-order bits of each element are filled with the initial value of the sign bit of the data element. If the value specified by the count operand is greater than 15 each destination data element is
filled with the initial value of the sign bit of the element.

Although illustrated and described herein with reference to certain specific embodiments, the present invention is nevertheless not intended to be limited to the details shown. Rather, various modifications may be made in the details within the scope and range of the equivalents of the claims and without departing from the spirit of the invention. It will be understood, for example, that the present invention is not limited to only loading a set of 8-DCT coefficients or other variables at a time, but may be extended to loading other sets of coefficients or variables into a register. For example, a set of 4-DCT coefficients or 12-DCT coefficients may be loaded into a register. In addition, registers other than registers of an Intel Pentium 4 processor may be used by the present invention.

What is claimed:

1. A method of processing a discrete cosine transform (DCT) block of coefficients, the method comprising the steps of:
    (a) receiving a DCT block of coefficients;
    (b) linearizing the DCT block of coefficients into a one dimensional array of sequentially arranged DCT coefficients;
    (c) concurrently storing a portion of the one dimensional array of DCT coefficients in a first register, the portion including at least two sequentially arranged DCT coefficients;
    (d) concurrently processing the stored portion of DCT coefficients in the first register, the processing including comparing the stored portion of DCT coefficients in the first register with values stored in a second register;
    (e) indexing a run length table using a hash key obtained by a comparison in step (d) of the DCT coefficients in the first register with values stored in the second register;
    (f) repeating steps (c) to (e) on a next portion of DCT coefficients in the one dimensional array to complete processing the DCT block of coefficients; and
    (g) providing a result of the processing to a video encoder/decoder.

2. The method of claim 1 in which step (d) includes determining a number of sequentially arranged DCT coefficients having a zero value stored in the first register.

3. The method of claim 2 in which
    step (d) includes simultaneously comparing the DCT coefficients stored in the first register with a set of zero values stored in the second register.

4. The method of claim 2 in which
    step (d) includes simultaneously comparing the DCT coefficients stored in the first register with a set of zero values stored in a second register, and storing a result of the comparison;
    step (e) includes applying a masking operation to the result of the comparison to obtain the hash key, and storing the hash key in a third register, and indexing the run length table using the hash key to determine a number of sequentially arranged DCT coefficients having zero values stored in the first register.

5. The method of claim 4 in which step (d) includes processing the stored portion of the DCT coefficients using streaming single-instruction-multiple-data extension 2 (SSE2) instructions for an Intel Pentium 4 processor.

6. The method of claim 1 in which
    step (a) includes receiving a DCT block of 64 coefficients; and
    step (c) includes storing 8 DCT coefficients in the first register.

7. A method of obtaining a run length value of a DCT block of coefficients in a video encoder/decoder, the method comprising the steps of:
    (a) receiving a DCT block or coefficients;
    (b) linearizing the DCT block of coefficients into a one dimensional array of sequentially arranged DCT coefficients;
    (c) storing a portion of the one dimensional array of DCT coefficients in a register, the portion including at least two sequentially arranged DCT coefficients;
    (d) concurrently comparing the DCT coefficients stored in the register with a set of zero values stored in another register; and
    (e) determining a run length value of the DCT coefficients by indexing a run-length table using a hash key obtained responsive to the comparison of step (d).

8. The method of claim 7 further including the steps of:
    (f) repeating steps (c) through (e) on a next portion of DCT coefficients in the one dimensional array; and
    (g) updating the run length value after completing step (f).

9. The method of claim 7 in which
step (d) includes applying a mask function to the results of the comparison to obtain the hash key.

10. The method of claim 7 in which
step (a) includes receiving a DCT block of 64 coefficients; and
step (c) includes storing 8 DCT coefficients in the first register.

11. The method of claim 10 in which the register is a 128 bit register; and
step (c) includes storing 8 sequentially arranged DCT coefficients, each DCT coefficient having a 16 bit value.

12. The method of claim 7 in which step (d) prior to the comparison step includes the steps of determining whether the DCT coefficients stored in the register include a −1 value; determining whether the DCT coefficients stored in the register include a =1 value; and replacing each of the determined −1 value and the determined =1 value with a corresponding zero value.

* * * * *